US012204091B2

(12) United States Patent
Broutin et al.

(10) Patent No.: US 12,204,091 B2
(45) Date of Patent: Jan. 21, 2025

(54) ELECTROWETTING OPTICAL DEVICES AND METHODS FOR MAKING THE SAME

(71) Applicant: Corning Incorporated, Corning, NY (US)

(72) Inventors: Jerome René Broutin, Bilieu (FR); Benjamin Jean-Baptiste Francois Burger, Lyons (FR); Aude Contet, Lyons (FR); Géraldine Denise Juliette Malet-Vasseur, Villeurbanne (FR); Nicolas Gilbert Jose Samper, La Côte St André (FR)

(73) Assignee: CORNING INCORPORATED, Corning, NY (US)

(*) Notice: Subject to any disclaimer, the term of this patent is extended or adjusted under 35 U.S.C. 154(b) by 512 days.

(21) Appl. No.: 17/621,732

(22) PCT Filed: Jun. 24, 2020

(86) PCT No.: PCT/US2020/039246
§ 371 (c)(1),
(2) Date: Dec. 22, 2021

(87) PCT Pub. No.: WO2020/263896
PCT Pub. Date: Dec. 30, 2020

(65) Prior Publication Data
US 2022/0252861 A1    Aug. 11, 2022

Related U.S. Application Data

(60) Provisional application No. 62/866,911, filed on Jun. 26, 2019.

(51) Int. Cl.
*G02B 26/00* (2006.01)
*B29D 11/00* (2006.01)
(Continued)

(52) U.S. Cl.
CPC ...... *G02B 26/005* (2013.01); *B29D 11/00807* (2013.01); *G02B 3/14* (2013.01); *B29K 2063/00* (2013.01)

(58) Field of Classification Search
CPC .. G02B 26/005; G02B 3/14; B29D 11/00807; B29K 2063/00
(Continued)

(56) References Cited

U.S. PATENT DOCUMENTS

2009/0021842 A1   1/2009   Berge et al.
2010/0110532 A1   5/2010   Takemoto et al.
2010/0149651 A1   6/2010   Berge et al.

FOREIGN PATENT DOCUMENTS

WO     2008/084822 A1    7/2008

OTHER PUBLICATIONS

International Search Report and Written Opinion of the International Searching Authority; PCT/US2020/039246; dated Aug. 19, 2020; pp. 11; European Patent Office.

*Primary Examiner* — William Choi
(74) *Attorney, Agent, or Firm* — Yiqun Zhao

(57) ABSTRACT

Electrowetting optical devices can comprise a first electrode at least partially circumscribing a first optical window and a second electrode at least partially circumscribing a second optical window. The second optical window may be aligned with the first optical window in a direction of the optical axis. A central region may be defined by a projection of a footprint of the second optical window. An interface between a first liquid and a second liquid that may be disposed within a containment region may form a lens. In some embodiments, a thickness of a second dielectric portion at least partially circumscribing the central region may be greater than a thickness of a thirst dielectric portion within the central region. In some embodiments, a capaci-
(Continued)

tance per area of the device upon application of a maximum operating voltage may be in a range from about 0.1 pF/mm$^2$ to about 3.5 pF/mm$^2$.

21 Claims, 11 Drawing Sheets

(51) Int. Cl.
 *G02B 3/14* (2006.01)
 *B29K 63/00* (2006.01)
(58) Field of Classification Search
 USPC .......................................... 359/290, 665, 666
 See application file for complete search history.

ELECTROWETTING OPTICAL DEVICES AND METHODS FOR MAKING THE SAME

CROSS-REFERENCE TO RELATED APPLICATIONS

This application claims the benefit of priority under 35 U.S.C. § 371 of International Application No. PCT/US2020/039246, filed on Jun. 24, 2020, which claims the benefit of priority of U.S. Provisional Application Ser. No. 62/866,911 filed on Jun. 26, 2019 the contents of which are relied upon and incorporated herein by reference in their entity as is fully set forth below.

This application claims the benefit of priority under 35 U.S.C. § 119 of U.S. Provisional Application No. 62/866,911, filed Jun. 26, 2019, the content of which is incorporated herein by reference in its entirety.

FIELD

The present disclosure relates generally to electrowetting optical devices and methods for making the same and, more particularly, to electrowetting optical devices with a lens formed by the interface of a first liquid and a second liquid.

BACKGROUND

It is known to form variable focus liquid lenses using two liquids. Due to the electrowetting effect, it is possible to change the curvature of the interface between the liquids by applying a voltage between a pair of electrodes. The use of liquid lenses has been proposed for cell phones as well as a range of other applications, including barcode readers, surveillance and traffic cameras, and medical and military applications, as such lenses are compact in size, robust in design and respond quickly enough to remove hand jitter artifacts. However, the power consumption of such devices can grow as the size of the lens increases. Also, the power consumption of current liquid lens designs can be problematic for mobile devices, especially those relying on a battery supply. Accordingly, it is desirable to provide an electrowetting optical device capable of functioning as a liquid lens with reduced power consumption.

SUMMARY

Some example embodiments of the disclosure are described below with the understanding that any of the embodiments may be used alone or in combination with one another.

Embodiment 1. An electrowetting optical device can comprise a first electrode at least partially circumscribing a first optical window. The electrowetting optical device may comprise a second electrode at least partially circumscribing a second optical window. The second optical window may be aligned with the first optical window along an optical axis. A central region of the electrowetting optical device can be defined by a projection of a footprint of the second optical window in a direction of the optical axis. The device can comprise a first dielectric portion partially covering the second optical window and positioned within the central area. The first dielectric portion comprises a first thickness. The device can comprise a second dielectric portion at least partially covering the second electrode and at least partially circumscribing the central area. The second dielectric portion can comprise a second thickness that is greater than the first thickness. The electrowetting optical device can comprise a first liquid and a second liquid disposed within a containment region. An interface between the first liquid and the second liquid may form a lens.

Embodiment 2. The electrowetting optical device of embodiment 1, wherein the second thickness is from about 0.5 micrometers to about 1 millimeter greater than the first thickness.

Embodiment 3. The electrowetting optical device of embodiment 2, wherein the second thickness is from about 10 micrometers to about 250 micrometers greater than the first thickness.

Embodiment 4. The electrowetting optical device of any one of embodiments 1-3, wherein the second dielectric portion comprises a first layer comprising a first material and a second layer comprises a second material. The first layer may at least partially cover the second electrode. The second layer may contact the first layer. The first layer may be disposed between the second electrode and the second layer.

Embodiment 5. The electrowetting optical device of embodiment 4, wherein the first dielectric portion comprises the first material.

Embodiment 6. The electrowetting optical device of any one of embodiments 4-5, wherein the first material comprises a hydrophobic insulating layer.

Embodiment 7. The electrowetting optical device of any one of embodiments 4-6, wherein the second material comprises a relative dielectric constant in a range from about 2 to about 50.

Embodiment 8. The electrowetting optical device of any one of embodiments 4-7, wherein the first material is the same as the second material.

Embodiment 9. The electrowetting optical device of any one of embodiments 4-7, wherein the second material is an epoxy.

Embodiment 10. The electrowetting optical device of any one of embodiments 1-9, wherein a capacitance of per area of the electrowetting optical device between the first electrode and the second electrode upon application of a maximum operating voltage between the first electrode and the second electrode is in a range from about 0.1 $pF/mm^2$ to about 3.5 $pF/mm^2$.

Embodiment 11. The electrowetting optical device of embodiment 10, wherein the capacitance per area of the electrowetting optical device between the first electrode and the second electrode upon application of the maximum operating voltage between the first electrode and the second electrode is in a range from about 0.1 $pF/mm^2$ to about 2.5 $pF/mm^2$.

Embodiment 12. The electrowetting optical device of any one of embodiments 1-11, wherein the first liquid and the second liquid are immiscible.

Embodiment 13. A method of making the electrowetting optical device of any one of embodiments 4-9 can comprise depositing a dielectric liquid into a reservoir defined by the second electrode. The method can comprise curing the dielectric liquid to form the first layer of the second dielectric portion. The method can also comprise depositing a dielectric layer comprising the first dielectric portion and the second layer of the second dielectric portion. The method can further comprise depositing the first liquid and the second liquid within the containment region. The method can additionally comprise sealing the first liquid and the second liquid within the containment region.

Embodiment 14. A method of making the electrowetting optical device of any one of embodiments 4-9 can comprise depositing a dielectric layer comprising the first dielectric portion and the second layer of the second dielectric portion.

The method can also comprise depositing a dielectric liquid into a reservoir defined by the second electrode. The method can comprise curing the dielectric liquid to form the first layer of the second dielectric portion. The method can further comprise depositing the first liquid and the second liquid within the containment region. The method can additionally comprise sealing the first liquid and the second liquid within the containment region.

Embodiment 15. The method of any one of embodiments 13-14, wherein the dielectric liquid comprises an epoxy.

Embodiment 16. The method of any one of embodiments 13-15, wherein the dielectric liquid comprises a solvent.

Embodiment 17. The method of embodiment 16, wherein curing the dielectric liquid comprises heating the dielectric liquid to a first temperature to drive off the solvent and then further heating the dielectric liquid to a second temperature to cure the dielectric liquid.

Embodiment 18. An electrowetting optical device can comprise a first electrode and a first optical window. The first electrode may at least partially circumscribe the first optical window. The electrowetting optical device may comprise a base comprising a second electrode and a second optical window. The second electrode may comprise a solid conductive material. The second electrode may at least partially circumscribe the second optical window. The second optical window may be aligned with the first optical window along an optical axis. A central region of the electrowetting optical device can be defined by a projection of a footprint of the second optical window in a direction of the optical axis. A capacitance of per area of the electrowetting optical device between the first electrode and the second electrode upon application of a maximum operating voltage between the first electrode and the second electrode is in a range from about 0.1 $pF/mm^2$ to about 3.5 $pF/mm^2$. The electrowetting optical device can comprise a first liquid and a second liquid disposed within a containment region. An interface between the first liquid and the second liquid may form a lens.

Embodiment 19. The electrowetting optical device of embodiment 18, wherein the capacitance of per area of the electrowetting optical device between the first electrode and the second electrode upon application of a maximum operating voltage between the first electrode and the second electrode is in a range from about 0.1 $pF/mm^2$ to about 2.5 $pF/mm^2$.

Embodiment 20. The electrowetting optical device of any one of embodiments 18-19, wherein the first liquid and the second liquid are immiscible.

Additional embodiments disclosed herein will be set forth in the detailed description that follows. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other embodiments are better understood when the following detailed description is read with reference to the accompanying drawings, in which.

DETAILED DESCRIPTION

Figure 1:
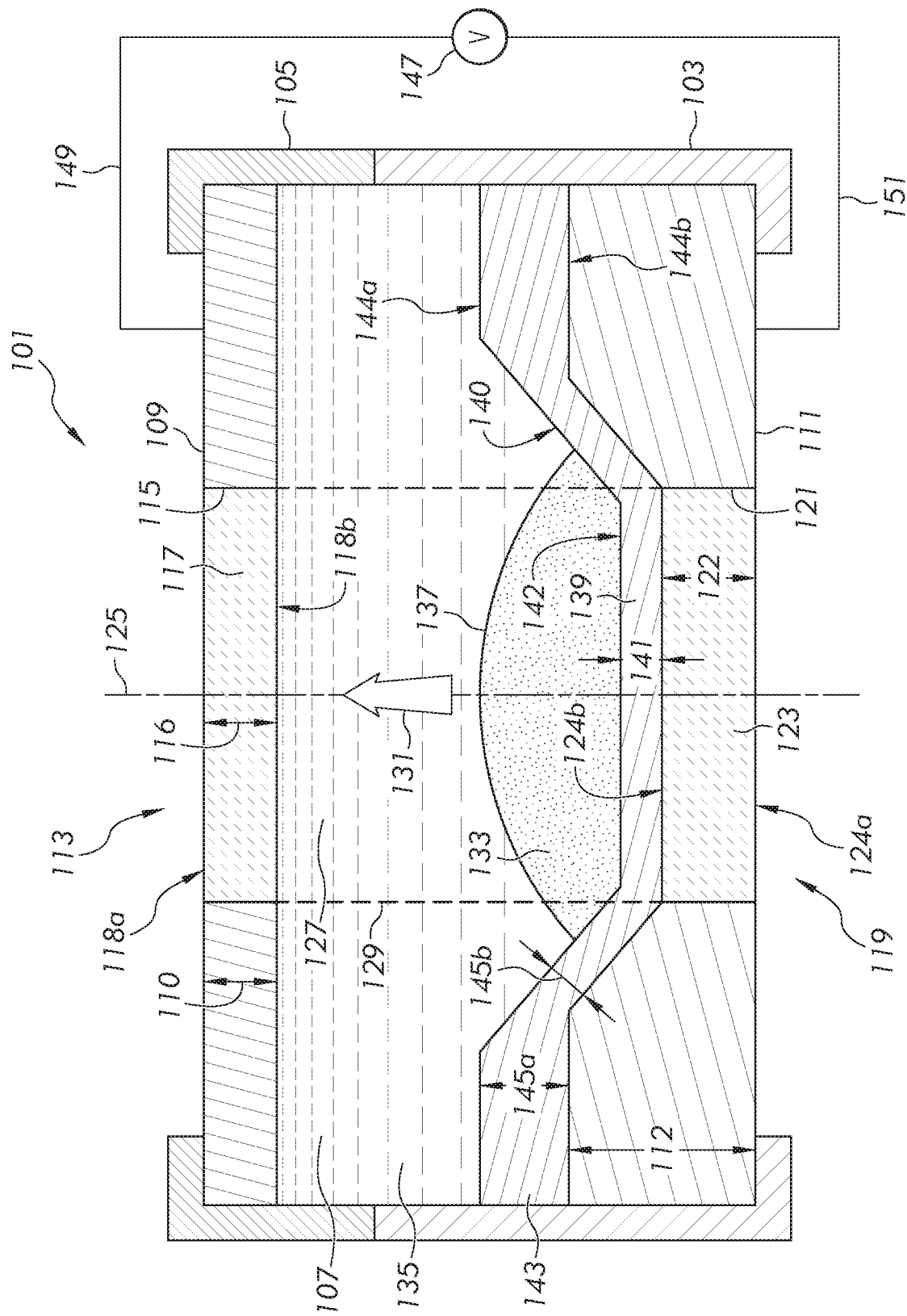
FIG. 1 illustrates a schematic cross-sectional view of an example embodiment of an electrowetting optical device.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

FIGS. 1-6 illustrate a cross-sectional view of electrowetting optical devices 101, 201, 301, 401, 501, and 601, respectively. Unless otherwise noted, a discussion of features of embodiments of one electrowetting optical device can apply equally to corresponding features of any of the embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

In various embodiments described herein, electrowetting optical devices can comprise a dielectric region with varying thicknesses. For example, a thickness of a portion of the dielectric region outside the central region (e.g., second dielectric portion, portions not substantially interacting with a first liquid) can be thicker than a thickness of a central portion of the dielectric region (e.g., first dielectric portion, a portion interacting with the first liquid). Such varying thicknesses of the dielectric region can enable decreased power consumption and/or capacitance of the electrowetting optical devices while retaining optical responsiveness. For example, the electrowetting optical devices described herein can exhibit decreased applied voltage to obtain a predetermined optical response and/or reduced capacitance at a predetermined applied voltage. For example, constructed embodiments of the disclosure have demonstrated a reduction in power consumption of about 40% or more.

Figure 4:
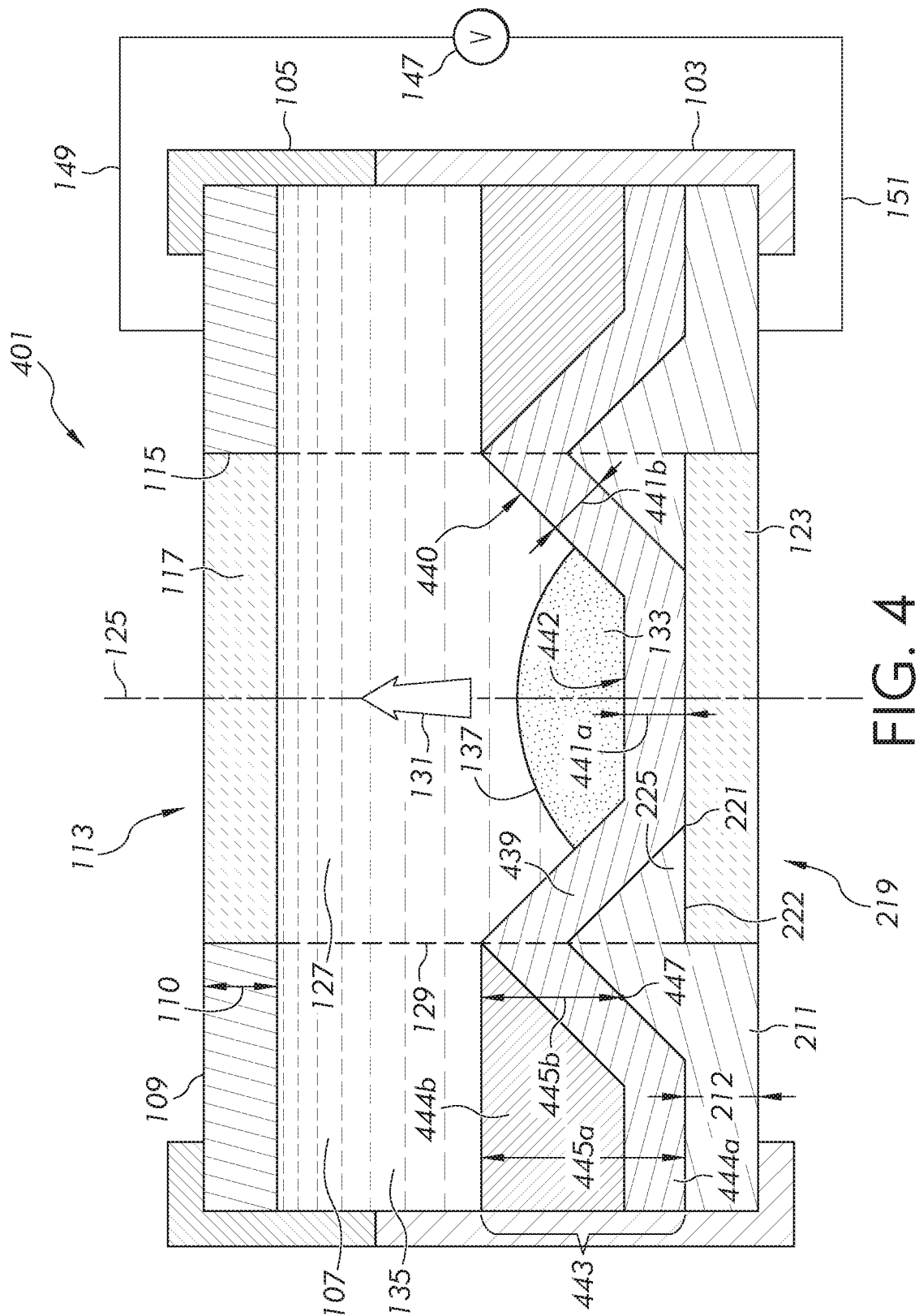
FIG. 4 illustrates a schematic cross-sectional view of another example embodiment of an electrowetting optical device.
Figure 5:
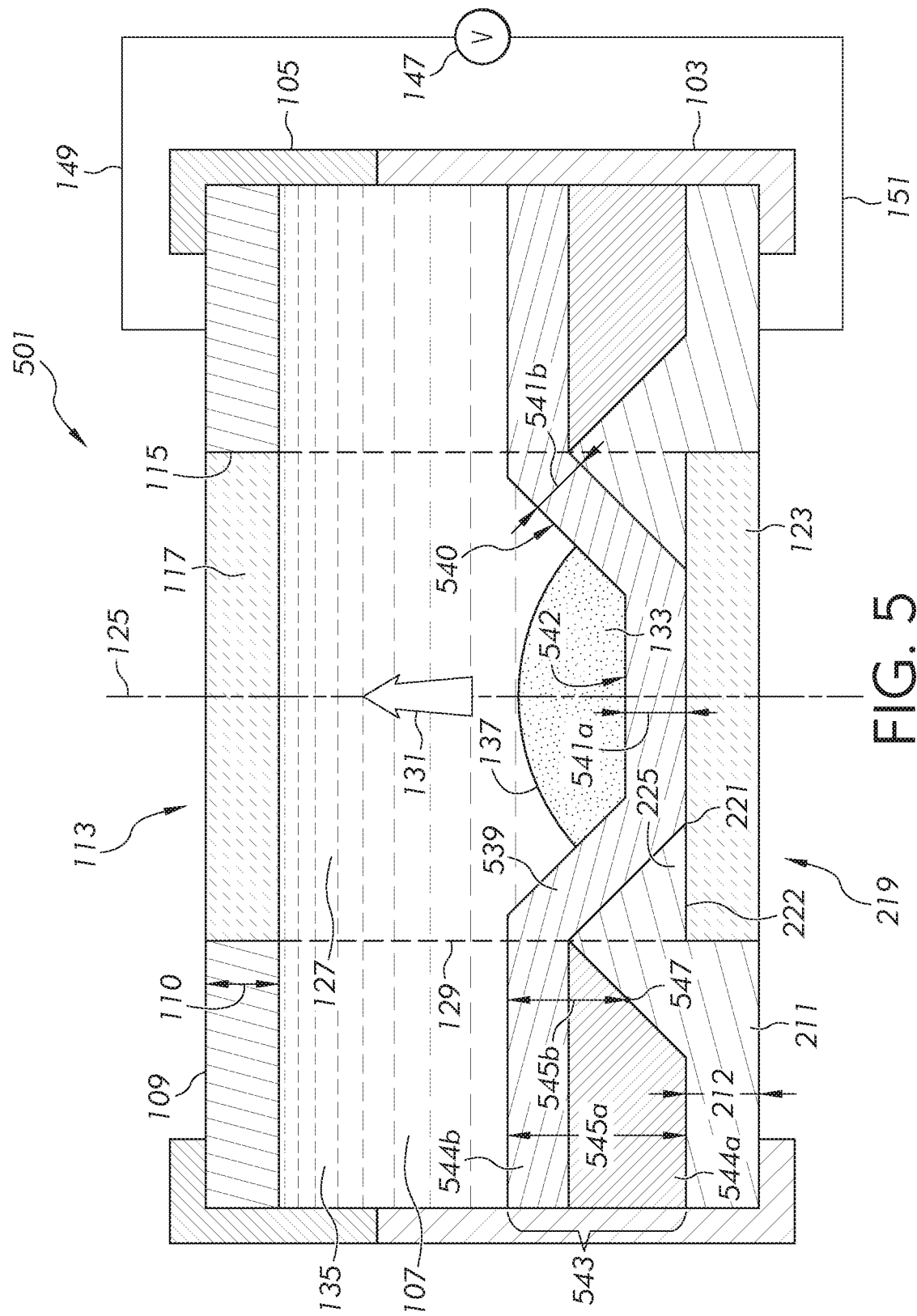
FIG. 5 illustrates a schematic cross-sectional view of another example embodiment of an electrowetting optical device.
Figure 6:
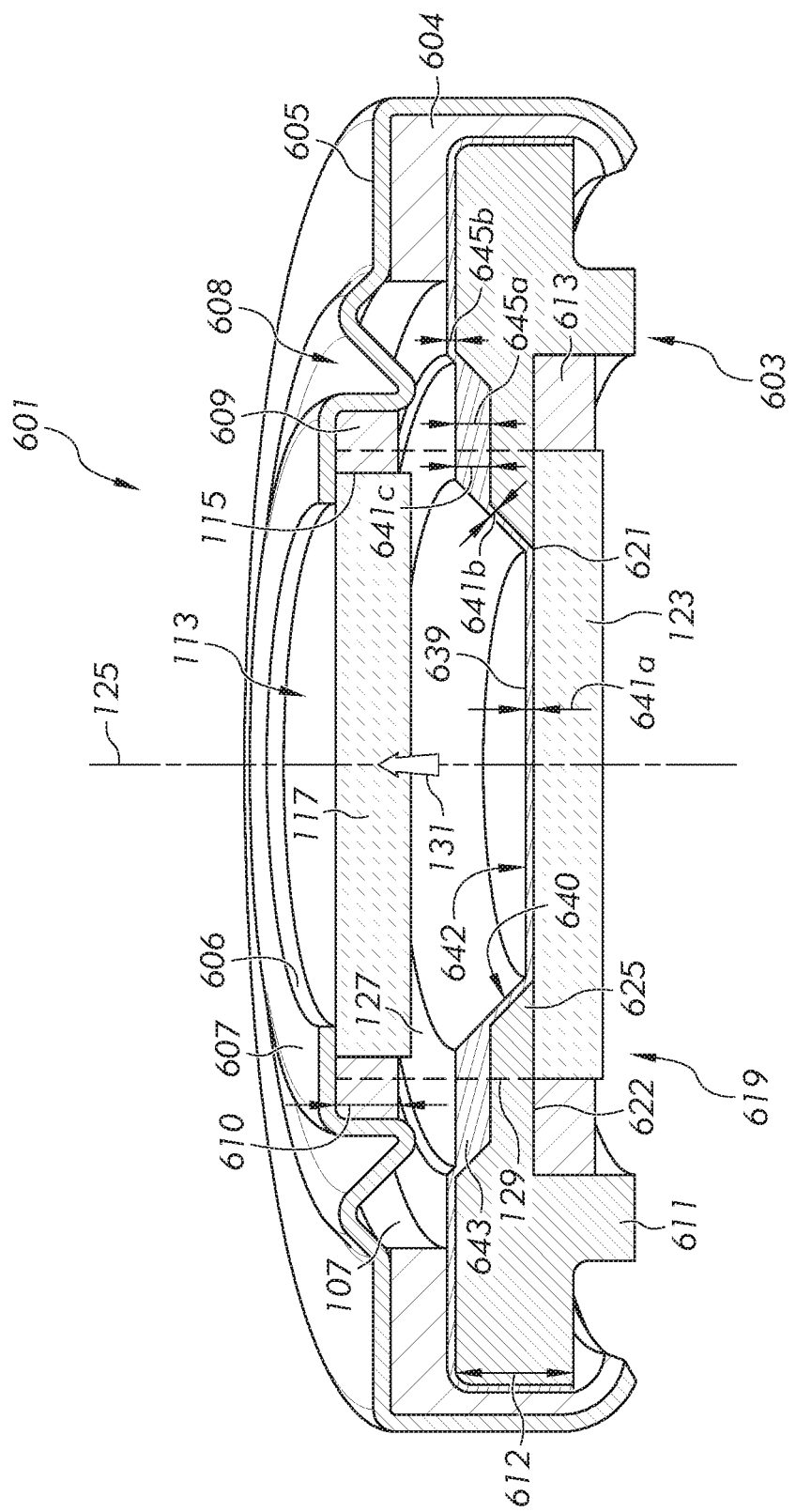
FIG. 6 illustrates a schematic cross-sectional view of another example embodiment of an electrowetting optical device.

As schematically shown in FIGS. 1-5, embodiments of the electrowetting optical device can comprise a base 103 and a cap 105. Likewise, as shown in FIG. 6, the electrowetting optical device 601 can comprise a base 603 and a cap 605. The base and the cap can be mounted relative to one another to facilitate maintenance of a fluid-tight containment region 107 to provide electrical insulation between the cap 605 and the base 611. In some embodiments, the portion of the base 103 in contact with the cap 605 and/or the second liquid 135 may comprise a non-conductive (e.g., dielectric, insulating) material. In some embodiments, a gasket may be provided between the base and the cap to facilitate maintenance of the fluid-tight containment region 107. For instance, as shown in FIG. 6, a gasket 604 may be disposed between the base 603 and the cap 605 to facilitate maintenance of the fluid-tight containment region 107. Although not shown, the electrowetting optical devices 101, 201, 301, 401, or 501 may also comprise a gasket between the base 103 and the cap 105 to facilitate maintenance of the fluid-tight containment region 107. In some embodiments, the gasket may comprise a polymer such as a rubber, a polyurethane, or a silicone. Examples of rubbers include polybutadiene, polyisoprene, polychloroprene (e.g., neoprene), polyisobutylene, styrene-butadiene rubbers, and acrylonitrile-butadiene rubbers. Examples of polymers include thermoplastic materials such as polytetrafluoroethylene (PTFE), perfluoroalkoxy (PFA), fluorinated ethylene propylene (FEP) polymers, and ethylene tetrafluoro ethylene (ETFE) polymers.

As shown in FIGS. 1-5, the electrowetting optical devices 101, 201, 301, 401, or 501 can each include a first electrode 109, that as shown, may be substantially identical to one another, although alternative configurations may be provided in further embodiments. In further embodiments, as shown in FIG. 6, the electrowetting optical device 601 may include a first electrode 609 in the form of a ring with an outer periphery of the ring including a cross-sectional height that may be substantially equal to the cross-sectional width although other configurations of the first electrode may be provided in further embodiments. In some embodiments, as shown in FIGS. 1-6, the first electrode 109 or 609 may comprise a thickness 110 or 610 in a first direction 131 of an optical axis 125 of the electrowetting optical devices 101, 201, 301, 401, 501, or 601 that may be substantially uniform as a function of radial distance from the optical axis 125 of the electrowetting optical devices 101, 201, 301, 401, 501, or 601. Although not shown, the thickness of the first electrode may vary as a function of radial distance from the optical axis. In some embodiments, whether the first electrode comprises a uniform thickness or a nonuniform thickness, the thickness of the first electrode may be rotationally symmetric about the optical axis, although the thickness of the first electrode may be rotationally asymmetric about the optical axis in further embodiments. For example, as shown in FIG. 1, the thickness 110 of the first electrode 109 is uniform and rotationally symmetric about the optical axis 125.

Figure 2:
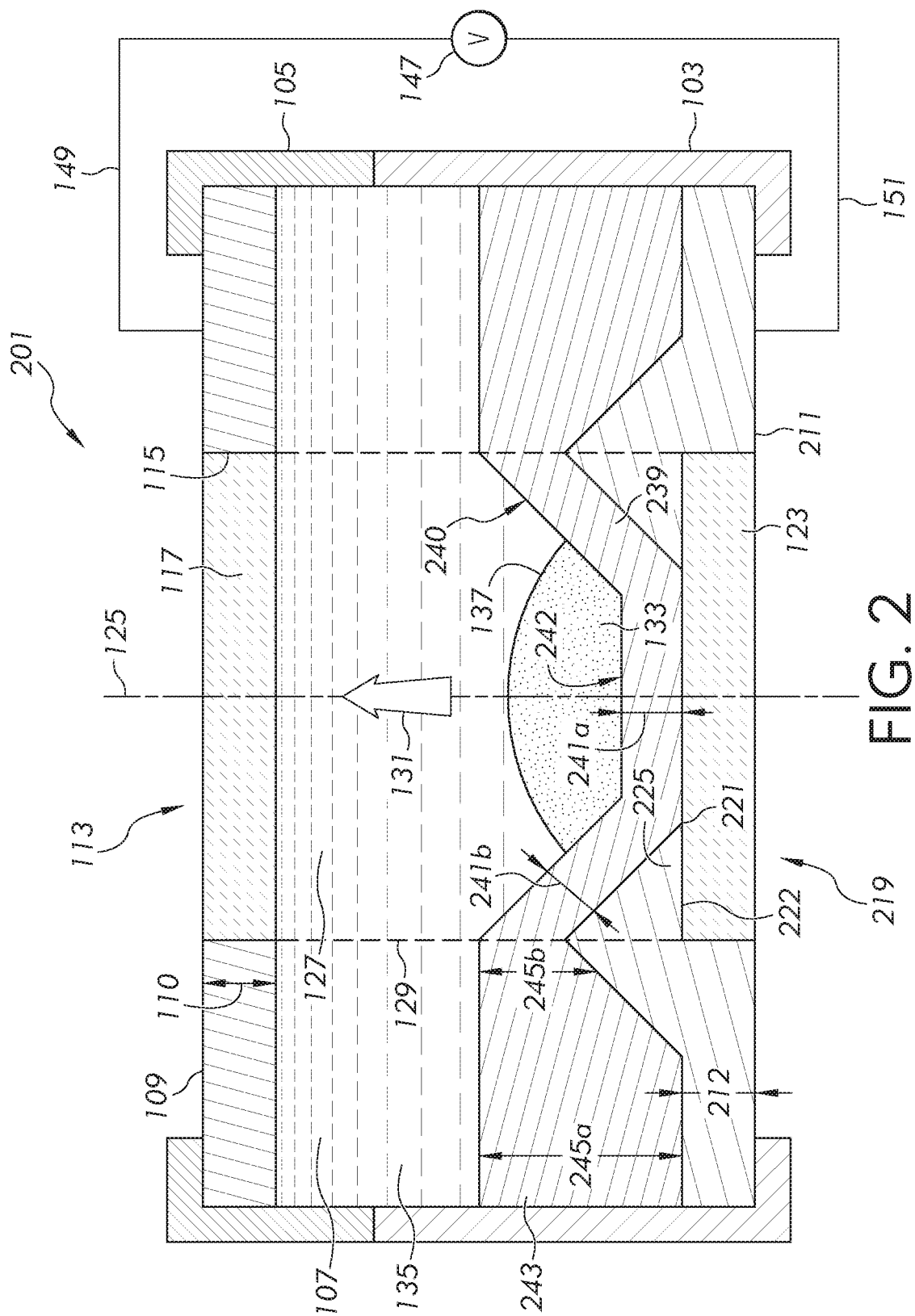
FIG. 2 illustrates a schematic cross-sectional view of another example embodiment of an electrowetting optical device.
Figure 3:
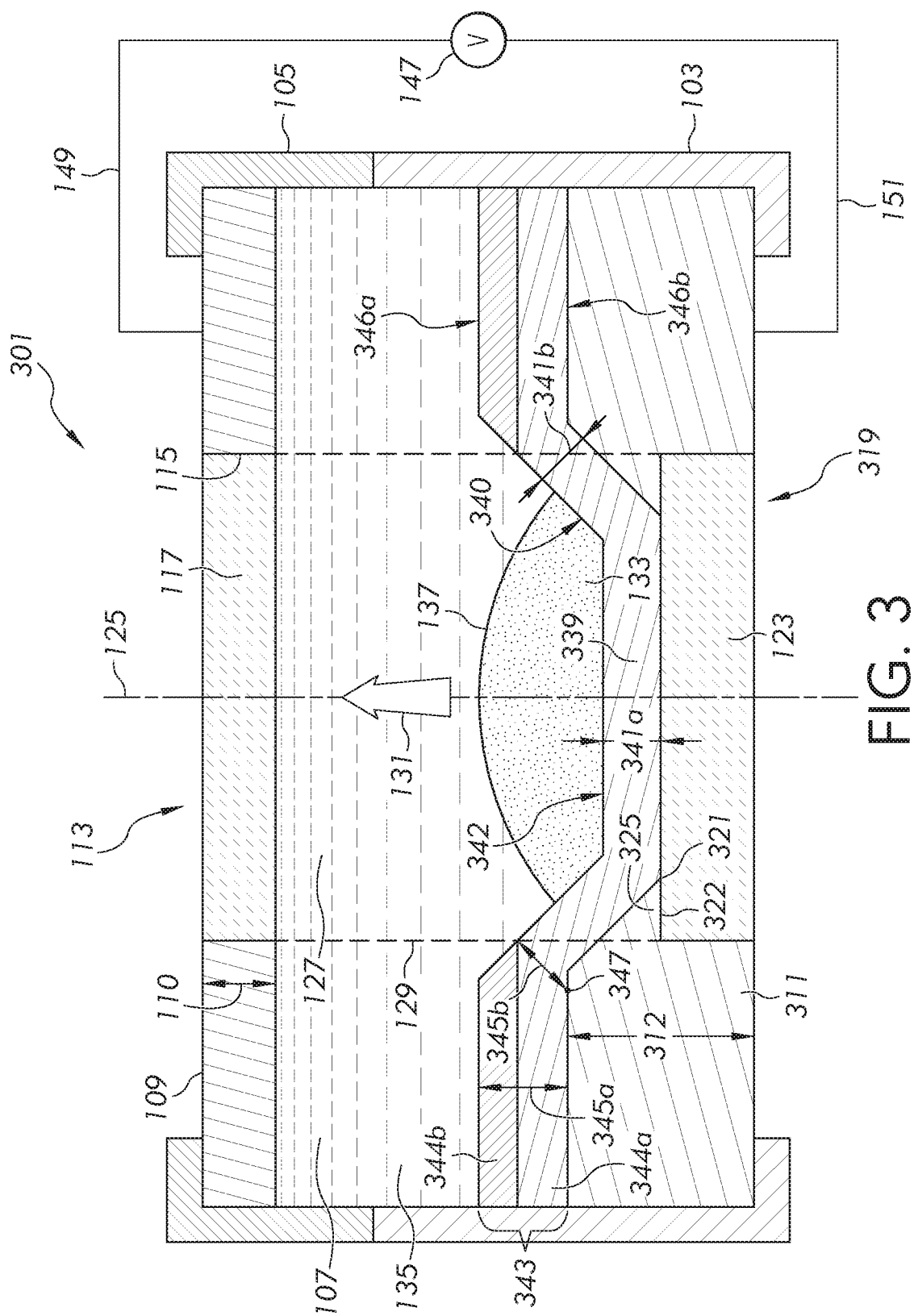
FIG. 3 illustrates a schematic cross-sectional view of another example embodiment of an electrowetting optical device.

The electrowetting optical devices of embodiments of the disclosure can further comprise a second electrode. For instance, the electrowetting optical device 101 of FIG. 1 illustrates an embodiment of a second electrode 111 that may be incorporated in various embodiments of the electrowetting optical device. FIGS. 2, 4, and 5 illustrate another embodiment of a second electrode 211 that may be incorporated in various embodiments of the electrowetting optical device. FIG. 3 illustrates yet another embodiment of a second electrode 311 that may be incorporated in various embodiments of the electrowetting optical device. FIG. 6 illustrates still another embodiment of a second electrode 611 that may be incorporated in various embodiments of the electrowetting optical device of the disclosure. In some embodiments, as shown in FIGS. 1-6, the second electrode 111, 211, 311, or 611 may comprise a thickness 112, 212, 312, or 612 in the first direction 131 of the optical axis 125 of the electrowetting optical devices 101, 201, 301, 401, 501, or 601 that can vary as a function of radial distance from the optical axis 125 of the electrowetting optical devices 101, 201, 301, 401, 501, or 601. Although not shown, the thickness of the second electrode may be substantially uniform as a function of radial distance from the optical axis. In some embodiments, whether or not a thickness 112, 212, 312, or 612 that varies (see FIG. 1-6) or is uniform (not shown), the thickness of the second electrode may be rotationally symmetric about the optical axis 125, although the thickness of the second electrode may not be rotationally symmetric about the optical axis in further embodiments. For example, as shown in FIGS. 1-6, the thickness 112, 212, 312, or 612 of the second electrode 111, 211, 311, or 611 is rotationally symmetric about the optical axis 125.

The first electrode 109 or 609 and/or the second electrode 111, 211, 311, or 611 may comprise a conductor. In some embodiments, the first electrode and/or the second electrode may comprise a metal including copper, silver, gold, platinum, aluminum, chromium, titanium, nickel, steel, bronze, and/or brass. In some embodiments, the first electrode and/or the second electrode may comprise an conductive polymer such as a poly(3,4,-ethylenedioxythiophene) (PEDOT), polyphenylsulfide (PSS), PEDOT:PSS, poly-p-phenylene(PpP), polythiophene (PTh), polyanilines (PANI), polypyrrole (PPy), polythalocyanine (PPhc), or polyisothianaphtalene (PITN). In some embodiments, the first electrode and/or the second electrode may comprise a material transparent over the operating wavelength range of the electrowetting optical device. In further embodiments, the second electrode may comprise one or more of PEDOT, PEDOT:PSS, aluminum oxide, cadmium oxide, gallium oxide, tin oxide (e.g., indium tin oxide (ITO)), and zinc oxide. In even further embodiments, the first electrode and/or second electrode can be doped with one or more transition metals and/or Group IIIA metals (e.g., aluminum, gallium indium, thallium). In some embodiments, the first electrode and/or the second electrode may comprise an intrinsically conductive polymer (e.g., the bulk of the polymer is conductive). In some embodiments, the first electrode and/or the second electrode may comprise a polymer composite with nanoparticles and/or carbon fiber.

Although not shown, some embodiments of the disclosure can provide the first electrode and/or the second electrode as a nonsolid body of material in that a cavity or other material component is encapsulated by the second electrode or surrounded by the second material on more than two sides. For example, a conductive trace deposited on more than sides of another material would not comprise a solid electrode. Alternatively, embodiments of the disclosure can provide the first electrode and/or the second electrode as a solid electrode in that the electrode is a monolithic body with no cavity or other material component encapsulated by the second electrode. For instance, as shown in FIGS. 1-6, the first electrode 109 or 601 and/or the second electrode 111, 211, 311, or 611 can be provided as a solid conductive material.

In some embodiments, the first electrode 109 or 609 of the electrowetting optical devices 101, 201, 301, 401, 501, or 601 illustrated in FIGS. 1-6 may circumscribe a first optical window 113. As shown in FIGS. 1-6, the first optical window 113 can comprise a through aperture 115 of the first electrode 109 or 609 wherein the first electrode 109 or 609 circumscribes the first optical window 113 by circumscribing the through aperture 115. Throughout the embodiments of the disclosure, the first electrode at least partially circumscribes the first optical window. As used herein, an electrode partially circumscribes an optical window if the electrode circumscribes the optical window in at least one cross-section (e.g. plane) perpendicular to the optical axis. For example, as shown in FIGS. 1-6, the first electrode 109 or 609 at least partially circumscribes the first optical window 113 because the first electrode 109 or 609 circumscribes the first optical window 113 in at least one cross-section (e.g., plane) perpendicular to the optical axis 125 of the electrowetting optical device 101, 201, 301, 401, 501, or 601. As used herein, an electrode entirely circumscribes an optical window if the electrode circumscribes the optical window in all cross-sections (e.g., planes) perpendicular to the optical axis that contain the corresponding optical window or the corresponding electrode. For example, as shown in FIGS. 1-6, the first electrode 109 or 609 entirely circumscribes the first optical window 113 because the first electrode 109 or 609 circumscribes the first optical window 113 for all cross-sections (e.g., planes) perpendicular to the optical axis 125 of the electrowetting optical device 101, 201, 301, 401, 501, or 601 containing the first electrode 109 or 609 or the first electrode 109 or 609. As discussed above, the first electrode may both partially circumscribe and fully circumscribe the first optical window. In some embodiments, although not shown, the first electrode may partially circumscribe but not fully circumscribe the first optical window; in such embodiments, the first electrode still at least partially circumscribes the first optical window because it partially circumscribes the first optical window.

In some embodiments, as shown, the first optical window 113 can further comprise a first transparent substrate 117. In some embodiments, the first transparent substrate 117 can be mounted relative to the through aperture 115. As shown, the first transparent substrate 117 may be mounted entirely within the through aperture 115 of the first electrode 109 or 609, and the first electrode 109 or 609 can entirely circumscribe the first transparent substrate 117. Although not shown, the first electrode may only partially circumscribe the first transparent substrate. Furthermore, although not shown, in some embodiments, the first transparent substrate may be mounted over an opening of the through aperture of the first electrode, and the first electrode may at least partially circumscribe the first optical window by at least partially circumscribing the through aperture of the first electrode without circumscribing the first transparent substrate. As shown, the through aperture 115 can optionally comprise a cross-sectional diameter (e.g., in a direction perpendicular to the optical axis 125) that is uniform along the first direction 131 of the optical axis 125. Although not shown, in some embodiments, the through aperture of the first electrode may comprise a cross-sectional diameter (e.g., in a direction perpendicular to the optical axis) that is stepped (e.g., comprises two different diameters) along the direction of the optical axis to define a seat for receiving at least a portion of the first transparent substrate, wherein portions of the first electrode may extend over an outer circumferential portion of one or both major surfaces of the first transparent substrate. In some embodiments, although not shown, the first optical window can further comprise a portion of the first electrode aligned with the first transparent substrate when the first electrode comprises a material transparent over the operating wavelength range of the electrowetting optical device, wherein the first electrode can at least partially circumscribe the first optical window by circumscribing the portion of the first optical window comprising the portion of the first electrode aligned with the first transparent substrate.

In some embodiments, the second electrode 111 of the electrowetting optical device 101 of FIG. 1 may at least partially circumscribe a second optical window 119. In further embodiments, as shown in FIG. 1, the second electrode 111 of the electrowetting optical device 101 of FIG. 1 may entirely circumscribe a second optical window 119. In some embodiments, the second electrode 211 of the electrowetting optical devices 201, 401, or 501 of FIG. 2, 4, or 5 may circumscribe a second optical window 219. In some embodiments, the second electrode 311 of the electrowetting optical device 301 of FIG. 3 may at least partially circumscribe a second optical window 319. In further embodiments, as shown in FIG. 2, 4, or 5, the second electrode 211 of the electrowetting optical devices 201, 401, or 501 may partially circumscribe the second optical window 219 without entirely circumscribing the second optical window 219. In further embodiments, the second electrode 611 of the corresponding electrowetting optical device 601 illustrated in FIG. 6 may at least partially circumscribe a second optical window 619.

The second optical window can comprise a through aperture of the second electrode that may comprise a cross-sectional diameter (e.g., in a direction perpendicular to the optical axis 125) that is uniform or is stepped along the first direction 131 of the optical axis 125, in some embodiments. For instance, as illustrated in FIG. 1, the second optical window 119 can comprise a through aperture 121 of the second electrode 111 that may comprise a cross-sectional diameter (e.g., in a direction perpendicular to the optical axis 125) that is uniform along the direction of the first direction 131 of the optical axis 125. In alternative embodiments, as illustrated in FIGS. 2, 4, and 5, the second optical window 219 can comprise a through aperture 221 of the second electrode 211 that may comprise a cross-sectional diameter (e.g., in a direction perpendicular to the optical axis 125); the cross-sectional diameter may be stepped along the first direction 131 of the optical axis to define a seat 222. Similarly, as illustrated in FIG. 3, the second optical window 319 can comprise a through aperture 321 of the second electrode 311 that may comprise a cross-sectional diameter (e.g., in a direction perpendicular to the optical axis 125) that is stepped along a first direction 131 of the optical axis 125 to define a seat 322. Still further, as illustrated in FIG. 6, the second optical window 619 may comprise a through aperture 621 of the second electrode 611 that may comprise a cross-sectional diameter (e.g., in a direction perpendicular to the optical axis 125) that is stepped along a first direction 131 of the optical axis 125 to define a seat 622. As shown in FIGS. 1-6, the second electrode 111, 211, 311, or 611 of the corresponding electrowetting optical devices 101, 201, 301, 401, 501, or 601 may circumscribe the corresponding second optical window 119, 219, 319, or 619 by circumscribing the through aperture 121, 221, 321, or 621.

In some embodiments, the second optical window 119, 219, 319, or 619 can further comprise a second transparent substrate 123. In some embodiments, the second 123 transparent substrate can be mounted relative to the corresponding through aperture 121, 221, 321, or 621. As shown in FIGS. 1-6, the second transparent substrate 123 may be mounted entirely within the through aperture 121, 221, 321, or 621 of the corresponding second electrode 111, 211, 311 or 611, and the second electrode 111, 211, 311, or 611 can entirely circumscribe the second transparent substrate 123. Although not shown, the second electrode may only partially circumscribe second transparent substrate 123. Furthermore, although not shown, in some embodiments, the second transparent substrate may be mounted over an opening of the through aperture of the second electrode, and the second electrode can circumscribe the second optical window by circumscribing the through aperture of the second electrode without circumscribing the second transparent substrate. As shown in FIGS. 2-5 and 6, in some embodiments, a portion 225, 325, 625 of the second electrode 211, 311, or 611 may optionally extend over an outer circumferential portion of one or both major surfaces of the second transparent substrate 123. In some embodiments, although not shown, the second optical window can further comprise a portion of the second electrode aligned with the second transparent substrate when the second electrode comprises a material transparent over the operating wavelength range of the electrowetting optical device, wherein the second electrode can at least partially circumscribe the second optical window by circumscribing the portion of the second optical window comprising the portion of the second electrode aligned with the second transparent substrate.

In some embodiments, the second transparent substrate 123 may optionally be mounted by a fitting 613 to the seat 222 of the through aperture 621. Furthermore, in some embodiments, as shown in FIG. 6, the base 603 may comprise the second electrode 611, the second optical window 619, and the optional fitting 613. In such embodiments, the gasket 604 may provide a fluid seal between the second electrode 611 of the base 603 and the cap 605 to facilitate maintenance of the fluid-tight containment region 107.

As shown in FIGS. 1-6, the cap 105 or 605 may comprise or support the first electrode 109 or 609 and the first optical window 113. In some embodiments, as shown in FIG. 6, the cap 605 can define an effective through aperture 606 that is smaller than a diameter of through aperture 115 of the first electrode 609, wherein a lip 607 can extend over the outer surface of the first electrode 609 and over an outer peripheral portion of the first optical window 113 to protect the first electrode 609 and the interface between the first transparent substrate 117 and the first electrode 609 from external forces and environmental conditions. Furthermore, as shown in FIG. 6, the lip 607 can also extend over an outer peripheral surface of the first electrode 609 to further help protect the first electrode 609 from external forces and environmental conditions as well as help seat the first electrode 609 within a reception area of the cap 605. As further illustrated in FIG. 6, the cap 605 may comprise a shape that is rotationally symmetric about the optical axis 125. In further embodiments, as shown, the cap 605 may comprise a substantially "S" shaped portion 608 that can comprise bent portions with one bent portion having an opening facing the fluid-tight containment region 107 and another bent portion having an opening facing away from the fluid-tight containment region 107. The substantially "S" shaped portion 608 may allow some movement of the first transparent substrate 117 in the first direction 131 of the optical axis 125 when pressure is exerted by the fluids (not shown for clarity) inside the fluid-tight containment region 107 of the electrowetting optical device 601 and/or when pressure is externally exerted on the cap 605 of the electrowetting optical device 601.

Throughout the disclosure, an optical aperture area of an electrowetting optical device is defined as the minimum of the area of the first optical window and area the second optical window. Throughout the disclosure, an optical aperture comprises an effective diameter of an optical aperture area of the optical aperture. As used herein, an effective diameter is a diameter of a circle comprising an area equal to the optical aperture area. In some embodiments, the optical aperture area may be circular, wherein the optical aperture may comprise a true diameter of the circular optical aperture area. In some embodiments, as shown in FIG. 6, the optical aperture area of the electrowetting optical device 601 may be defined by a lip 607 of the cap 605. In some embodiments, as shown in FIGS. 2-5, the optical aperture area of the electrowetting optical device 201, 301, 401, or 501 may be defined by the second optical window 219 or 319. In further embodiments, the second electrode may comprise a material that is not transparent (see below), and the optical aperture area may be substantially equal to the cross-sectional area (e.g., perpendicular to the optical axis) circumscribed by the second electrode. In some embodiments, the optical aperture area may be substantially circular. In some embodiments, the optical aperture area of an electrowetting optical device may be about 0.1 mm$^2$ or more, about 1 mm$^2$ or more, about 3 mm$^2$ or more, about 10 mm$^2$ or more, about 20 mm$^2$ or more, about 100 mm$^2$ or less or about 50 mm$^2$ or less. In some embodiments, the optical aperture area of an electrowetting optical device may be in a range from about 0.1 mm$^2$ to about 100 mm$^2$, from about 0.1 mm$^2$ to about 50 mm$^2$, from about 1 mm$^2$ to about 100 mm$^2$, from about 1 mm$^2$ to about 50 mm$^2$, from about 3 mm$^2$ to about 100 mm$^2$, from about 3 mm$^2$ to about 50 mm$^2$, from about 10 mm$^2$ to about 100 mm$^2$, from about 10 mm$^2$ to about 50 mm$^2$, from about 20 mm$^2$ to about 100 mm$^2$, from about 20 mm$^2$ to about 50 mm$^2$, or any range or subrange therebetween.

Throughout the disclosure, an optical axis of an electrowetting optical device is defined as a line intersecting the centroid of the optical aperture area of the electrowetting optical device and runs in a direction perpendicular to the optical aperture area. As used herein the centroid is a center of geometry of an area, which is an arithmetic average of all points in the optical aperture area. In some embodiments, the optical axis intersects both the first optical window and the second optical window. For example, with reference to FIG. 2, the optical axis 125 is at the centroid (e.g., center) of the optical aperture area of the electrowetting optical device 201, and the optical axis 125 intersects both the first optical window 113 and the second optical window 219. In some embodiments, as shown, the optical axis 125 may comprise an axis that passes through the center of volume of both the first transparent substrate 117 and the second transparent substrate 123. In some embodiments, the electrowetting optical device is rotationally symmetric about the optical axis 125.

As shown, the second optical window 119, 219, 319, or 619 can be aligned with the first optical window 113 along the optical axis 125. As shown, the second optical window 119, 219, 319, or 619 is considered aligned with the first optical window 113 since the optical axis extends through both the first optical window and the second optical window. In some embodiments, transmittance through the first optical window 113 and the second optical window 119, 219, 319, or 619 into the fluid-tight containment region 107 or out of the fluid-tight containment region 107 is about 85% or more. For example, the area of the second optical window 119 of the electrowetting optical device 101 of FIG. 1 where transmission is about 85% or more can comprise an entire surface area of a major surface of the second transparent substrate 123 since the entire surface area of the major surface of the second transparent substrate 123 is not obscured by any portion of the second electrode 111. In contrast, the area of the second optical window 219 of the electrowetting optical device 201 of FIG. 2 where transmission is about 85% or more can comprise the interior portion of the surface area of the interior major surface of the second transparent substrate 123 that is not obscured by the portion 225 of the second electrode 211 extending over the outer peripheral surface portion of the second transparent substrate 123.

The first transparent substrate 117 and the second transparent substrate 123 may comprise a portion or all of the substrate with a transparent region comprising an average light transmission over an operating wavelength range of about 85% or greater, about 88% or greater, about 90% or greater, about 92% or greater, about 94% or greater, about 96% or greater, about 98% or greater, or about 99% or greater. As used herein, transmittance refers to an arithmetic average (e.g., mean) percentage of incident light intensity transmitted through a material or a device over the operating wavelength range. In further embodiments, the operating wavelength range may be over visible optical wavelengths. In further embodiments, the operating wavelength range may be over a range of optical wavelengths from about 400 nanometers (nm) to 700 nm, from about 400 nm to about 550 nm, from about 550 nm to about 700 nm, from about 600 nm to about 700 nm, or any range or subrange therebetween. In some embodiments, the operating wavelength range may be over infrared optical wavelengths. In further embodiments, the operating wavelength range may be over a range of optical wavelengths from about 700 nm to about 1,000 micrometers (μm), from about 700 nm to about 700 μm, from about 700 nm to about 70 μm, from about 700 nm to about 10 μm, from about 700 nm to about 5 μm, from about 5 μm to about 1,000 μm, from about 5 μm to about 700 μm, from about 5 μm to about 70 μm, from about 5 μm to about 10 μm, from about 10 μm to about 70 μm, from about 70 μm to about 700 μm, or any range or subrange therebetween. In some embodiments, the operating wavelength range may be over a range of ultraviolet optical wavelengths. In further embodiments, the operating wavelength range may be over a range of optical wavelengths from about 10 nm to about 400 nm, from about 100 nm to about 400 nm, from about 200 nm to about 400 nm, from about 10 nm to about 300 nm, from about 100 nm to about 300 nm, from about 200 nm to about 300 nm, from about 10 nm to about 200 nm, from about 100 nm to about 200 nm, or any range or subrange therebetween. In further embodiments, the operating wavelength range may be over a range of optical wavelengths from about 315 nm to about 400 nm, from about 280 nm to about 315 nm, from about 100 nm to about 280 nm, or from 122 nm to about 200 nm.

In some embodiments, as shown in FIGS. 1-6, the first transparent substrate 117 may comprise a thickness 116 between a first major surface 118a and a second major surface 118b of the first transparent substrate 117 that is substantially uniform. As further shown in FIGS. 1-6, the second transparent substrate 123 may comprise a thickness 122 between a first major surface 124a and a second major surface 124b of the second transparent substrate 123 that is substantially uniform. Although not shown, in some embodiments, the thickness of the first transparent substrate and/or the thickness of the second transparent substrate may be nonuniform. In still further embodiments, whether uniform or nonuniform, a profile of the thickness of the first and/or second transparent substrate may be rotationally symmetric about the optical axis 125. In some embodiments, the thickness of the first transparent substrate and/or the uniform or nonuniform thickness of the second transparent substrate may be within a range from about 10 micrometers (μm) to about 10 millimeters (mm), from about 10 μm to about 5 mm, from about 10 μm to about 1 mm, from about 100 μm to about 10 mm, from about 100 μm to about 5 mm, from about 100 μm to about 1 mm, from about 300 μm to about 5 mm, from about 300 μm to about 3 mm, from about 300 μm to about 1 mm, or any range or subrange therebetween.

When viewed in a direction facing the first major surface 118a of the first transparent substrate 117, the outer peripheral surface of the first major surface 118a of the first transparent substrate 117 may comprise a wide range of peripheral profile shapes. Additionally or alternatively, when viewed in a direction facing the first major surface 124a of the second transparent substrate 123, the outer peripheral surface of the first major surface 124a of the second transparent substrate 123 may comprise a wide range of peripheral profile shapes such as the illustrated circular shape. Any of the above-referenced peripheral profile shapes can comprise a shape of a polygon with three or more sides (e.g., triangular, quadrilateral), a curvilinear shape (e.g., circular shape, elliptical shape) or a shape comprising a combination of polygonal shape(s) and curvilinear shape(s).

The first transparent substrate 117 and/or the second transparent substrate 123 can comprise a polymer, a crystalline material (e.g., quartz, sapphire, single crystal or polycrystalline alumina, spinel ($MgAl_2O_4$)), a glass-based material, or combinations thereof. Examples of suitable polymers comprise, without limitation, the following including copolymers and blends thereof: thermoplastics including polystyrene (PS), polycarbonate (PC), polyesters including polyethyleneterephthalate (PET), polyolefins including polyethylene (PE), acrylic polymers including polymethyl methacrylate (PMMA), epoxies, and silicones including polydimethylsiloxane (PDMS). As used herein, "glass-based" includes both glasses and glass-ceramics, wherein glass-ceramics have one or more crystalline phases and an amorphous, residual glass phase. A glass-based material may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate. However, other strengthening methods known in the art, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali containing borosilicate glass, alkali aluminophosphosilicate glass, and alkali aluminoborosilicate glass. In one or more embodiments, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from about 0 mol % to about 10 mol %, $ZrO_2$ in a range from about 0 mol % to about 5 mol %, $P_2O_5$ in a range from about 0 mol % to about 15 mol %, $TiO_2$ in a range from about 0 mol % to about 2 mol %, $R_2O$ in a range from about 0 mol % to about 20 mol %, and RO in a range from 0 mol % to about 15 mol %. As used herein, $R_2O$ can refer to an alkali metal oxide such as $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate may optionally further comprise in a range from about 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$.

The first transparent substrate 117 and/or the second transparent substrate 123 can comprise an optional coating. In some embodiments, the coating, if provided, may comprise an easy-to-clean coating, a low-friction coating, an oleophobic coating, a diamond-like coating, a scratch-resistant coating, an abrasion resistant coating, or a combination thereof. A scratch-resistant coating may comprise an oxynitride, for instance, aluminum oxynitride or silicon oxynitride with a thickness of about 500 micrometers or more. In such embodiments, the abrasion resistant layer may comprise the same material as the scratch resistant layer. In some embodiments, a low friction coating may comprise a highly fluorinated silane coupling agent, for instance, an alkyl fluorosilane with oxymethyl groups pendant on the silicon atom. In such embodiments, an easy-to-clean coating may comprise the same material as the low friction coating. In other embodiments, the easy-to-clean coating may comprise a protonatable group such as an amine, for instance, an alkyl aminosilane with oxymethyl groups pendant on the silicon atom. In such embodiments, the oleophobic coating may comprise the same material as the easy-to-clean coating. In some embodiments, a diamond-like coating comprises carbon and may be created by applying a high voltage potential in the presence of a hydrocarbon plasma.

Throughout the disclosure, a central region of the electrowetting optical devices is defined as a projection of a footprint of the second optical window in the first direction 131 of the optical axis 125 toward the first transparent substrate 117. For example, with reference to FIGS. 1-6, a central region 127 of the electrowetting optical device 101 is defined as a projection 129 of the footprint of the second optical window 119 in the first direction 131 of the optical axis 125 toward the first transparent substrate 117. The footprint of the second optical window 119 being projected comprises an area of the through aperture 121 of the second transparent substrate 123 when viewing the second major surface 124b of the second transparent substrate 123 in a second direction opposite the first direction 131 of the optical axis 125. For example, as shown in FIG. 1, the footprint comprises the surface area of the second major surface 124b of the second transparent substrate 123. Although not shown, the footprint may comprise a surface area larger than the surface area of the second major surface 124b in embodiments where the outer edge surface of the second transparent substrate 123 are rounded or are not perpendicular to the second major surface 124b.

Throughout the disclosure, a relative dielectric constant of a material is defined as a ratio between the absolute permittivity of the material measured at 20° C. under 1 atmosphere and the permittivity of free space (i.e., a vacuum). For example, the relative dielectric constant of air is about 1.0005, the relative dielectric constant of polytetrafluoroethylene (PFTE) is about 2, the relative dielectric constant of silicon is about 11.68, the relative dielectric constant of water is about 80.2 and the relative dielectric constant of strontium titanate is about 310. As used throughout the disclosure, a material is conductive if it comprises a relative dielectric constant of 100 or more and a material is not conductive if it comprises a relative dielectric constant of less than 100. As used throughout the disclosure, a material is a dielectric if it comprises a relative dielectric constant in a range from about 2 to about 50. As used throughout the disclosure, a material is an insulator if it comprises a relative dielectric in a range from about 2 to about 10. As such, a material can be both a dielectric and an insulator. Without wishing to be bound by theory, the relative dielectric constant of a pure metal (e.g., copper) may approach infinity, which would qualify it as a conductor.

As shown in FIGS. 1-5, the electrowetting optical device 101, 201, 301, 401, or 501 can comprise a first liquid 133 and a second liquid 135 disposed within the fluid-tight containment region 107. As further shown, an interface 137 can be provided between the first liquid 133 and the second liquid 135. The interface 137 may form a lens. In some embodiments, the first liquid 133 may comprise substantially the same density as the second liquid 135. In some embodiments, the first liquid 133 may comprise a refractive index that is greater than a refractive index of a second liquid 135. In some embodiments, the first liquid 133 may comprise a refractive index that is less than a refractive index of a second liquid 135. In some embodiments, an absolute value of a difference between a refractive index of the first liquid 133 and a refractive index of a second liquid 135 may be in a range from about 0.1 to about 1.0, from about 0.1 to about 0.8, from about 0.1 to about 0.5, from about 0.1 to about 0.3, from about 0.2 to about 1.0, from about 0.2 to about 0.8, from about 0.2 to about 0.5, from about 0.2 to about 0.3, or any range or subrange therebetween. In some embodiments, the first liquid 133 may be immiscible in the second liquid 135. As used herein, a first liquid and a second liquid are immiscible if they do not substantially form a solution but rather form an emulsion when mixed. Two liquids do not substantially form a solution, for example, if their partial miscibility is below 0.2%.

In some embodiments, the first liquid 133 and the second liquid 135 can be immiscible liquids that form the interface 137 where the immiscible fluids meet. In some embodiments, although not shown, the interface 137 may comprise a transparent membrane that separates the first fluid from the second fluid. In embodiments providing the interface as a membrane, the first fluid may be miscible with the second fluid wherein the membrane forms the interface 137. As shown, the interface 137 can be convex in the first direction 131 of the optical axis 125. In some embodiments, although not shown, the interface can be concave in the first direction of the optical axis. In some embodiments, the optical axis 125 can pass through an extreme point (e.g., maximum, minimum) point on the interface. For instance, as shown, the optical axis 125 can pass through a maximum of the interface 137 that is convex, and that maximum is farthest from the second transparent substrate 123 in the first direction 131 of the optical axis 125.

In some embodiments, the first liquid 133 may comprise a non-conductive liquid. In some embodiments, the first liquid 133 may comprise a non-polar liquid. Example embodiments of the first liquid 133 include inorganic liquids (e.g., silicone oil), alkyl chain molecules (e.g., hexane, heptane, octane, nonane, decane), aromatic compounds (e.g., benzene, toluene, diphenyldimethylsilane, 2-(ethylthio)benzothiazole, 1-choloronaphtalene, thianaphtene, 4-bromodiphenyl ether, 1-phenylnaphtalene, 2,5,-dibromotolune, phenyl sulphide), or combinations thereof.

In some embodiments, the second liquid 135 may comprise a conductive liquid. In some embodiments, the second liquid 135 may comprise a polar liquid. Example embodiments of the second liquid 135 includes alcohols (e.g., methanol, propanediols), glycols (e.g., ethylene glycol, propylene glycol, trimethylene glycol), ionic liquids (e.g., lithium carbonate, 1-ethyl-3-methylimidazolium-based, 1-alkylpyridinium-based, 1-butyl-3-methylimidazolium tetrafluoroborate-based, N-methyl-N-alkylpyrrolidinium-based liquids), inorganic ionic solutions (e.g., sodium phosphate, sodium bromide, sodium chloride, calcium chloride, lithium chloride, ammonium carbonate, ammonium tetrafluoroboratepotassium nitrate), organic ionic solutions (e.g., potassium acetate, acetic acid, succinic acid, iminodiacetic acid (IDA), nitrilotriacetic acid (NTA), ethylenediaminetetraacetic acid (EDTA), diethylene triamine pentaaectic acid (DTPA), ethylene glycol tetraacetic acid (EGTA), 1,2-bis(o-aminophenoxy)ethane-N,N,—N'N'-tetraacetic acid (BAPTA), 2,2'2"-(1,4,7,-triazonane-1,4,7,-triyl)triacetic acid (NOTA), 1,4,7,10-tetranzacyclododecane-1,4,7,10-tetraacetic acid (DOTA)), and combinations thereof.

Throughout the disclosure, a first material partially covers a second material if the first material is between the second material and the containment region. In other words, a first material partially covers a second material if, when moving along a straight path originating in a containment region, the first material would be encountered before the second material. For example, with reference to FIG. 1, a dielectric material partially covers the second optical window 119 because a straight path originating in the fluid-tight containment region 107 would encounter the dielectric material before the second optical window 119. Throughout the disclosure, a first material materially fully covers a second material if all straight paths starting within the containment region that encounter a second material must encounter the first material before encountering the second material. For example, with reference to FIG. 1, the dielectric material fully covers the second optical window 119 because all straight paths originating in the fluid-tight containment region 107 that encounter the second optical window 119 must encounter the dielectric material before encountering the second optical window 119. In the above examples, as shown in FIG. 1, the dielectric material both partially covers and fully covers the second optical window 119. However, the dielectric material may both partially cover and fully cover a second electrode in some embodiments while the dielectric material partially covers but does not fully cover a second electrode. For example, as shown in FIG. 1, the dielectric material partially covers and fully covers the second electrode 111.

Embodiments of the disclosure can comprise a dielectric material at least partially covering (e.g., fully covering) the second electrode and the second optical window. Throughout the disclosure a first dielectric portion of the dielectric material is considered the portion of the dielectric material positioned within a central region 127 defined by the projection 129 of the footprint of the second optical window 119, as discussed above. Furthermore, throughout the disclosure, a second dielectric portion of the dielectric material is considered the portion of the material positioned outside of the central region 127 defined by the projection 129 of the footprint of the second optical window 119.

Throughout the embodiments of the disclosure, the dielectric portion comprises a first major surface closest to the fluid-tight containment region and a second major surface opposite the first major surface of the dielectric portion, wherein the second major surface of the dielectric portion is further from the containment region than the first major surface. For example, as shown in FIGS. 1 and 3, the dielectric portion comprises a first major surface 144a or 346a that is defined by the surface of the dielectric portion closest to the fluid-tight containment region 107. As further shown in FIGS. 1 and 3, the dielectric portion comprises a second major surface 144b or 346b that is defined by the surface of the dielectric portion farthest from the fluid-tight containment region 107. As shown, the first major surface 144a or 346a of the dielectric portion is opposite the second major surface 144b or 346b of the dielectric portion with the dielectric portion between the first major surface 144a or 346a and the second major surface 144b or 346b of the dielectric portion, inclusive.

As used herein, a thickness of a dielectric portion (e.g., first dielectric portion, second dielectric portion) at a location on the second major surface of the dielectric portion is measured as the shortest distance between the first major surface of the dielectric portion and the second major surface of the corresponding dielectric portion within that dielectric portion. For example, with reference to FIG. 3, a thickness of the first dielectric portion 339 of the dielectric region along the base surface 342 is measured as thickness 341a, which is the shortest distance between the first major surface 346a of the first dielectric portion 339 and the second major surface 346b of the first dielectric portion 339. With further reference to FIG. 3, a thickness of the second dielectric portion 343 at the location 347 shown on the second major surface 346b of the second dielectric portion 343 is measured as thickness 345b, which is the shortest distance between the first major surface 346a of the second dielectric portion 343 and the second major surface 346b of the second dielectric portion 343. In some embodiments, as shown in FIG. 3, the thickness 345b at the location 347 on the second major surface 346b of the second dielectric portion 343 may be measured in a direction that is neither in the first direction 131 of the optical axis nor a direction perpendicular to the first major surface 346a or second major surface 346b of the second dielectric portion 343. In some embodiments, as shown in FIGS. 4-5, the thickness (e.g., thickness 445b or 545b) at a location (e.g., location 447 or 547) on the second major surface of the second dielectric portion may be in the first direction 131 of the optical axis 125 because a direction of the shortest path between the first major surface and the second major surface of the second dielectric portion at that location; however, the thickness 445b or 545b may not be perpendicular to the first major surface or the second major surface. In some embodiments, as shown in FIG. 3, the thickness (e.g., thickness 345a) may be measured in a direction that is both perpendicular to the second major surface 346b of the second dielectric portion 343 at the location where the thickness is measured and parallel to a first direction 131 of the optical axis 125 because both directions coincide with a direction of the shortest path between the first major surface 346a and the second major surface 346b of the second dielectric portion 343. In some embodiments, as shown in FIG. 3, the thickness (e.g., thickness 341b) may be measured at a location on the second major surface of the first dielectric portion 339 in a direction that is both perpendicular to the first major surface 346a of the first dielectric portion 339 at the corresponding location where the thickness measurement shown intersects the first major surface 346a and perpendicular to the second major surface 346b of the first dielectric portion 339 at the location where the thickness is measured.

Throughout the disclosure, the first dielectric portion can comprise a thickness and the second dielectric portion can comprise a thickness that is greater than the thickness of the first dielectric portion. As used herein, the thickness of the second dielectric portion is greater than the thickness of the first dielectric portion as long as at least one thickness of second dielectric portion is greater than a thickness of the first dielectric portion. In some embodiments, a thickness at one or more locations of the second dielectric portion can be greater than the thickness of the first dielectric portions at all locations within the central region 127. In some embodiments, throughout the disclosure, a thickness of all locations of the dielectric portion outside the central region 127 can be greater than or equal to all thicknesses of the first dielectric portion at all locations within the central region 127.

The electrowetting optical device 101 of FIG. 1 illustrates the dielectric material comprising a first dielectric portion 139 at least partially covering the second optical window 119 and positioned within the central region 127. Indeed, the first dielectric portion 139 at least partially covers the through aperture 121 of the second optical window 119 and also at least partially covers the second transparent substrate 123. As shown, in some embodiments the first dielectric portion 139 can optionally contact the second transparent substrate 123 while at least partially covering the second transparent substrate 123. As shown, the first dielectric portion 139 can comprise a first thickness 141. The electrowetting optical device 101 of FIG. 1 further includes a second dielectric portion 143 at least partially covering the second electrode 111 and circumscribing the central region 127. The second dielectric portion 143 can comprise a second thickness (e.g., second thickness 145a, 145b). A second thickness of the second dielectric portion 143 can be greater than the first thickness of the first dielectric portion 139. For example, a second maximum thickness 145a of the second dielectric portion 143 can be greater than a first thickness 141 of the first dielectric portion 139 within the central region 127. For example, in some embodiments, as shown in FIG. 1, the second maximum thickness 145a of the second dielectric portion 143 can be greater than all first thicknesses 141 of the first dielectric portion 139 at all locations within the central region 127.

The electrowetting optical device 201, 401, or 501 of FIG. 2, 4, or 5 illustrates the dielectric material comprising a first dielectric portion 239, 439, or 539 at least partially covering the second optical window 219 and positioned within the central region 127. Indeed, the first dielectric portion 239, 439, or 539 at least partially covers the through aperture 221 of the second optical window 219 and also at least partially covers the second transparent substrate 123. As shown, in some embodiments the first dielectric portion 239, 439, or 539 can optionally contact the second transparent substrate 123 while at least partially covering the second transparent substrate 123. For instance, as shown, a central portion of the first dielectric portion 239, 439, or 539 can contact the central portion of the second transparent substrate 123 to at least partially cover the central portion of the second transparent substrate 123 while a peripheral portion of the first dielectric portion 239, 439, or 539 can also at least partially cover a peripheral portion of the second transparent substrate 123 with the portion 225 of the second electrode 211 positioned between the peripheral portion of the first dielectric portion 239, 439 or 539 and the peripheral portion of the second transparent substrate 123. As shown, the first dielectric portion 239, 439, or 539 can comprise a first thickness (e.g., first thickness 241a, 241b, 441a, 441b, 541a, or 541b). The electrowetting optical device 201, 401, or 501 of FIG. 2, 4, or 5 further includes a second dielectric portion 243, 443, or 543 partially covering the second electrode 211 and circumscribing the central region 127. The second dielectric portion 243, 443, or 543 can comprise a second thickness (e.g., second thickness 245a, 245b, 445a, 445b, 545a, or 545b). A second thickness of the second dielectric portion 243, 443, or 543 can be greater than the first thickness of the first dielectric portion 239, 439, or 539. Indeed, for example, a second maximum thickness 245a, 445a, or 545a of the second dielectric portion 243, 443, or 543 can be greater than all thicknesses (e.g., first thickness 241a, 241b, 441a, 441b, 541a, or 541b) of the first dielectric portion 239, 439, or 539 at all locations within the central region 127.

The electrowetting optical device 301 of FIG. 3 illustrates the dielectric material comprising a first dielectric portion 339 at least partially covering the second optical window 319 and positioned within the central region 127. For example, the first dielectric portion 339 at least partially covers the through aperture 221 of the second optical window 319 and also at least partially covers the second transparent substrate 123. As shown, in some embodiments the first dielectric portion 339 can optionally contact the second transparent substrate 123 while at least partially covering the second transparent substrate 123. For instance, as shown, a central portion of the first dielectric portion 339 can contact the central portion of the second transparent substrate 123 to at least partially cover the central portion of the second transparent substrate 123 while a peripheral portion of the first dielectric portion 339 can also at least partially cover a peripheral portion of the second transparent substrate 123 with the portion 325 of the second electrode 311 positioned between the peripheral portion of the first dielectric portion 339 and the peripheral portion of the second transparent substrate 123. As shown, the first dielectric portion 339 can comprise a first thickness (e.g., first thickness 341a or 341b). The electrowetting optical device 301 of FIG. 3 further includes a second dielectric portion 343 partially covering the second electrode 311 and circumscribing the central region 127. The second dielectric portion 343 can comprise a second thickness (e.g., second thickness 345a or 345b). A second thickness of the second dielectric portion 343 can be greater than the first thickness of the first dielectric portion 339. Indeed, for example, a second maximum thickness 345a of the second dielectric portion 343 can be greater than all thicknesses (e.g., first thickness 341a and 341b) of the first dielectric portion 339 at all locations within the central region 127.

The electrowetting optical device 601 of FIG. 6 illustrates the dielectric material comprising a first dielectric portion 639 at least partially covering the second optical window 619 and positioned within the central region 127. Indeed, the first dielectric portion 639 at least partially covers the through aperture 621 of the second optical window 619 and also at least partially covers the second transparent substrate 123. As shown, in some embodiments the first dielectric portion 639 can optionally contact the second transparent substrate 123 while at least partially covering the second transparent substrate 123. For instance, as shown, a central portion of the first dielectric portion 639 can contact the central portion of the second transparent substrate 123 to at least partially cover the central portion of the second transparent substrate 123 while a peripheral portion of the first dielectric portion 639 can also at least partially cover a peripheral portion of the second transparent substrate 123 with the portion 625 of the second electrode 611 positioned between the peripheral portion of the first dielectric portion 639 and the peripheral portion of the second transparent substrate 123.

As shown in FIG. 6, the first dielectric portion 639 can comprise a first thickness (e.g., first thickness 641*a*, 641*b*, or 641*c*). The electrowetting optical device 601 of FIG. 6 further includes a second dielectric portion 643 partially covering the second electrode 611 and circumscribing the central region 127. The second dielectric portion 643 can comprise a second thickness (e.g., second thickness 645*a* or 645*b*). A second thickness of the second dielectric portion 643 can be greater than the first thickness of the first dielectric portion 639. Indeed, for example, a second maximum thickness 645*a* of the second dielectric portion 643 can be greater than first thicknesses 641*a* and 641*b* of the first dielectric portion 639. Furthermore, as shown, the second maximum thickness 645*a* of the second dielectric portion 643 can be equal to a maximum first thickness 641*c* of the first dielectric portion 339. As further illustrated, in some embodiments, another second thickness 645*b* of the second dielectric portion 643 may be less than the maximum first thickness 641*c*. As shown, the second maximum thickness 645*a* of the second dielectric portion 643 can be greater than or equal to all thicknesses (e.g., first thickness 641*a*, 641*b*, and 641*c*) of the first dielectric portion 639. As such, the thickness of the second dielectric portion 643 is greater than the first thickness of the first dielectric portion 639 because the second maximum thickness 645*a* of the second dielectric portion 643 is greater than at least one thickness of the first dielectric portion 639 (e.g., first thicknesses 641*a*, 641*b*).

In any of the embodiments of the disclosure, a second thickness (e.g., second thickness 145*a*, 245*a*, 345*a*, 445*a*, 545*a*, or 645*a*) of the second dielectric portion 143, 243, 343, 443, 543, or 643 may be greater than a first thickness (e.g., first thickness 141*a*, 241*a*, 341*a*, 441*a*, 541*a*, or 641*a*) of the first dielectric portion 139, 239, 339, 439, 539, or 639 by about 500 micrometers (μm) or more, about 1 μm or more, about 10 μm or more, about 50 μm or more, about 100 μm or more, about 200 μm or more, about 1 mm or less, about 600 μm or less, or about 400 μm or less, or about 250 μm or less. In some embodiments, the second thickness (e.g., second thickness 145*a*, 245*a*, 345*a*, 445*a*, 545*a*, or 645*a*) of the second dielectric portion 143, 243, 343, 443, 543, or 643 may be greater than a first thickness (e.g., first thickness 141*a*, 241*a*, 341*a*, 441*a*, 541*a*, or 641*a*) of the first dielectric portion 139, 239, 339, 439, 539, or 639 within a range from about 0.5 μm to about 1 mm, from about 0.5 μm to about 600 μm, 0.5 μm to about 400 μm, from about 0.5 μm to about 250 μm, from about 1 μm to about 1 mm, from about 1 μm to about 600 μm, from about 1 μm to about 400 μm, from about 1 μm to about 250 μm, from about 10 μm to about 1 mm, from about 10 μm to about 600 μm, from about 10 μm to about 400 μm, from about 10 μm to about 250 μm, from about 50 μm to about 1 mm, from about 50 μm to about 600 μm, from about 50 μm to about 400 μm, from about 50 μm to about 250 μm, from about 100 μm to about 1 mm, from about 100 μm to about 600 μm, from about 100 μm to about 400 μm, from about 200 μm to about 400 μm, from about 1 μm to about 600 μm, from about 200 μm to about 500 μm, or any range or subrange therebetween.

As shown in FIGS. 1-6, embodiments of the disclosure provide a reservoir defined by a sloped surface 140, 240, 340, 440, 540, or 640 and a base surface 142, 242, 342, 442, 542, or 642 of the first dielectric portion 139, 239, 339, 439, 539, or 639 for reception of the first liquid 133 (not shown for clarity in FIG. 6). As shown, in some embodiments, the sloped surface 140, 240, 340, 440, 540, or 640 can flare outwardly from the optical axis 125 in the first direction 131 of the optical axis 125. As further illustrated, in some embodiments, the sloped surface 140, 240, 340, 440, 540, or 640 of the first dielectric portion 639 may circumscribe the base surface 142, 242, 342, 442, 542, or 642 that at least partially covers the second transparent substrate 123. As shown, in some embodiments, the base surface 142, 242, 342, 442, 542, or 642 can comprise a substantially flat surface although other surface shapes may be provided in further embodiments. In some embodiments, the sloped surface 140, 240, 340, 440, 540, or 640 alone or together with the base surface 142, 242, 342, 442, 542, or 642, may comprise a frustoconical, frustospherical, or frustoellipsoidal surface. In some embodiments, as shown in FIGS. 2 and 4-6, the sloped surface 240, 440, 540, or 640 may be disposed within the central region 127. Alternatively, as shown in FIGS. 1 and 3, a portion of the sloped surface 140 or 340 can be positioned outside of the central region 127.

As shown in FIGS. 3-5, in some embodiments, the second dielectric portion 343, 443, or 543 can comprise a first layer 344*a*, 444*a*, or 544*a* comprising a first material and a second layer 344*b*, 444*b*, or 544*b* comprising a second material. As shown, the first layer 344*a*, 444*a*, or 544*a* can at least partially cover the second electrode 211 or 311, the second layer 344*b*, 444*b*, or 544*b* can contact the first layer 344*a*, 444*a*, or 544*a*. In further embodiments, as shown in FIGS. 3-5, the first layer 344*a*, 444*a*, or 544*a* can be disposed between the second electrode 211 or 311 and the second layer 344*b*, 444*b*, or 544*b*. In some embodiments, the first dielectric portion can comprise the first material of the first layer of the second dielectric portion. For instance, as shown in FIGS. 3-4, the first dielectric portion 339 or 439 can continue as the first layer 344*a* or 444*a* as a continuous layer of the same first material. In some embodiments, the first dielectric portion can comprise the second material of the second layer of the dielectric portion. For instance, as shown in FIG. 5, the first dielectric portion 539 can continue as the second layer 544*b* as a continuous layer of the same material.

In some embodiments, the first material of the first layer 344*a*, 444*a*, or 544*a* may be the same as the second material of the second layer 344*b*, 444*b*, or 544*b* although the first layer and the second layer may comprise different materials in further embodiments. In some embodiments, the first material may comprise a hydrophobic insulating layer. In some embodiments, the second material may comprise a hydrophobic insulating layer. In some embodiments, the second material may comprise an epoxy and can have a relative dielectric constant in a range from about 2 to about 50. As used herein, a material is hydrophobic if a water contact angle with the material is about 80° or more. In some embodiments, a hydrophobic insulating material can comprise a glass-based material, a mineral such as mica, porcelain, paraffin, a silane, a fluorosilanes, a silicone, or a polymer. Examples of polymers that are hydrophobic insulating materials include parylene, polytetrafluoroethylene, polystyrene, polymethacrylates (e.g., polybutylmethacrylate), polyvinylchloride, polyethylene terephthalate, polyurethanes, block copolymers comprising styrene, polyolefins, or polyesters, a rubber, or an epoxy. Examples of rubbers that are hydrophobic insulating materials include polybutadiene, polyisoprene, polychloroprene (e.g., neoprene), polyisobutylene, styrene-butadiene rubbers, acrylonitrile-butadiene rubbers. Examples of epoxies include bisphenol-based epoxy resins, novolac-based epoxies, cycloaliphatic-based epoxies, and glycidylamine-based epoxies. In some embodiments, the hydrophobic insulating materials may comprise a blend of the above materials. The dielectric material, including the first material and/or the second material, can comprise without limitation one or more of the materials listed above as hydrophobic insulating layers, the materials listed above for the optical windows, diamond, paper, or an inorganic material (e.g., silicon-based compounds, germanium-based compounds).

The electrowetting optical devices of the disclosure may comprise a power source connected to the first electrode and the second electrode. For example, as shown in FIGS. 1-5, the electrowetting optical device 101, 201, 301, 401 or 501 may comprise a power source 147 connected to the first electrode 109 with a first lead 149 and connected to the second electrode 111, 211, or 311 with a second lead 151. Although not shown, the electrowetting optical device 601 may also comprise a similar or identical power source connected to the first and second electrode. In some embodiments, although not shown, the first electrode may be connected to a ground by a first lead while the second electrode is connected to the power supply by a second lead. In some embodiments, although not shown, the first electrode may be connected to the power supply by a first lead while the second electrode is connected to a ground by a second lead. As used herein, ground refers to a connection to earth or another large reservoir of charge such as a large conductive body. As used herein, a power source 147 is any device capable of creating an electric potential difference. In some embodiments, the power source 147 may comprise a battery, a capacitor, a fuel cell, a generator. In some embodiments, the power source 147 may comprise a commercially available power supply unit such as a programmable power supply unit, an uninterruptible power supply unit, a switched-mode power supply unit, and/or a linear regulator power supply unit. In some embodiments, the power source 147 may be automatically controlled by a computer (e.g., microprocessor) such as a commercially available driver for electrowetting optical devices. In other embodiments, the power source 147 may be manually adjusted.

Application of an electrical potential difference between the first electrode and the second electrode from the power source can change the shape of the lens formed by the interface between the first liquid and the second liquid. Without wishing to be bound by theory, the lens formed by the interface between the first liquid and the second liquid may be adjusted using the electrowetting phenomena by adjusting the applied potential difference between the first electrode and the second electrode. In some embodiments, a root mean square (rms) of the applied potential difference may be in a range from about 0 V to about 120 V, from about 0 V to about 100 V, from about 0 to about 70 V, from about 0 V to about 50 V, from about 0 V to about 20 V, or any range or subrange therebetween. In some embodiments, adjusting the applied voltage may change the focal length of the lens. As used herein, the optical power of a lens is measured using diopters, which is a reciprocal of a focal length of a lens. In some embodiments, the optical power may be adjusted by about 0.25 diopters (D) or more, about 1 D or more, about 2 D or more, about 5 D or more, about 40 D or less, about 30 D or less, about 20 D or less or about 10 D or less. In some embodiments, the optical power of the lens may be adjustable in a range from about −20 D to about 20 D, from about −15 D to about 15 D, from about −10 D to about 10 D, from about −5 D to about 5 D, from about −2 D to about 2 D, from about 0 D to about 20 D, from about 0 D to about 10 D, from about 0 D to about 5 D, from about 0 D to about 2 D, or any range or subrange therebetween.

As used herein, the maximum operating voltage is the greatest electrical potential difference that can be applied between the first electrode and the second electrode to obtain a change in the optical power of the lens of the electrowetting optical device. For example, increasing the operating voltage beyond the maximum operating voltage may produce zero or substantially zero change in optical power of the lens. Without wishing to be bound by theory, the optical power may be limited to the maximum operating voltage as a result of electrowetting saturation of the liquids in the containment region, dielectric breakdown of the dielectric material partially covering the second electrode, or a geometrical design of the device.

Throughout the disclosure, a capacitance of an electrowetting device is measured as between the first electrode and the second electrode upon application of the maximum operating voltage between the first electrode and the second electrode. As used herein, the area of the electrowetting optical device between the first electrode and the second electrode is defined as surface area of the first major surface of the dielectric region (e.g., first major surface 143a, 346a of the dielectric region of electrowetting optical device 101, 301) of. In some embodiments, the capacitance per area of the electrowetting optical device may be about 0.1 picofarads per millimeter squared ($pF/mm^2$) or more, about 1 $pF/mm^2$ or more, about 1.25 $pF/mm^2$ or more, about 3.5 $pF/mm^2$ or less, about 3 $pF/mm^2$ or less, or about 2.5 $pF/mm^2$ or less. In some embodiments, the capacitance per area of the electrowetting optical device may be in a range from about 0.1 $pF/mm^2$ to about 3.5 $pF/mm^2$, from about 0.1 $pF/mm^2$ to about 3 $pF/mm^2$, from about 0.1 $pF/mm^2$ to about 2.5 $pF/mm^2$, from about 0.1 $pF/mm^2$ to about 3.5 $pF/mm^2$, from about 1 $pF/mm^2$ to about 3.5 $pF/mm^2$, from about 1 $pF/mm^2$ to about 3 $pF/mm^2$, from 1 about $pF/mm^2$ to about 2.5 $pF/mm^2$, from about 1.25 $pF/mm^2$ to about 3.5 $pF/mm^2$, from about 1.25 $pF/mm^2$ to about 3 $pF/mm^2$, from about 1.25 $pF/mm^2$ to about 2.5 $pF/mm^2$, or any range or subrange therebetween.

Embodiments of methods of making the electrowetting optical devices in accordance with the embodiments of the disclosure will be discussed with reference to the flow chart in FIG. 16 and example method steps illustrated in FIGS. 7-15.

Figure 7:
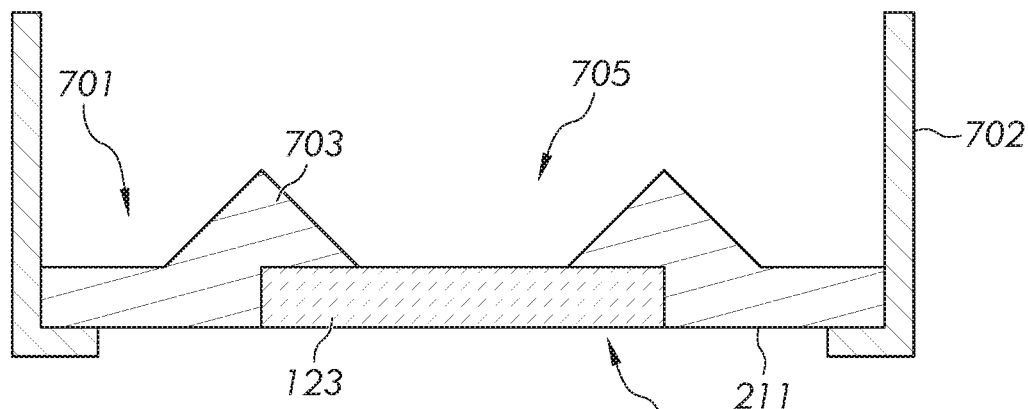
FIG. 7 illustrates a step in first and second methods of making an electrowetting optical device.

Example embodiments of making the electrowetting optical device 501 illustrated in FIG. 5 will now be discussed with reference to FIGS. 7-11 and the flow chart in FIG. 16. In a first step 1601 of methods of the disclosure, as shown in FIG. 7, initial portions of the electrowetting optical device 501 may be provided. In some embodiments, the initial portions may be provided by obtaining the initial portions from a supplier. In some embodiments, the initial portions may be provided by making and/or assembling the initial portions. As shown, the initial portions may comprise the second electrode 211 and the second optical window 219. In some embodiments, the base apparatus 702 from which a base (e.g., base 103) is formed may be provided to support the second electrode 211 and can also be configured to define a reservoir 701 between the second electrode 211 and the base 103. For instance, as shown, the second electrode 211 can include a dam 703 to define the reservoir 701 between an outwardly facing surface of the dam 703 and an inwardly facing surface of the base apparatus 702. In some embodiments, as shown, the dam 703 may comprise a peripheral dam that circumscribes a reception area 705. As shown, in some embodiments, the dam 703 can comprise a circular peripheral dam the circumscribes the reception area 705.

Figure 8:
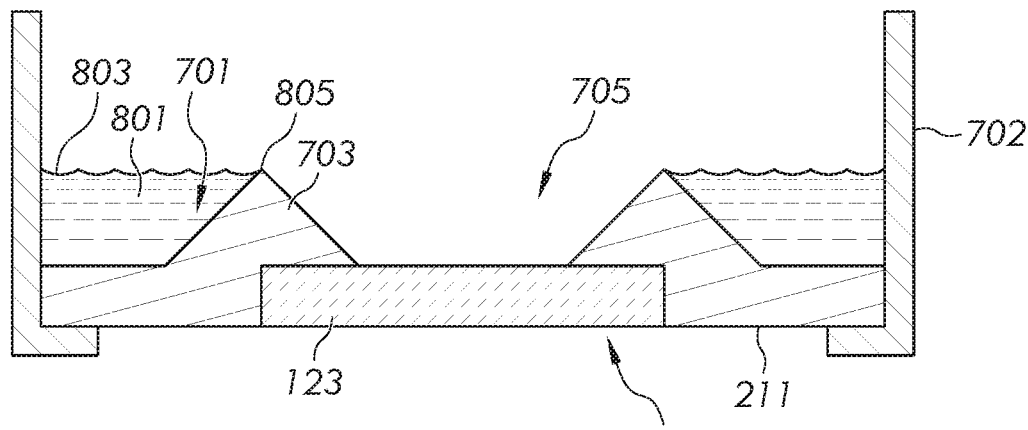
FIG. 8 illustrates another step in the first method of making an electrowetting optical device.

After step 1601, as shown in FIG. 8, methods of the disclosure can proceed to step 1603, which comprise depositing a dielectric liquid 801 into the reservoir 701. In some embodiments, a conduit (e.g., flexible tube, micropipette, or syringe) may be used to deposit a dielectric liquid 801 into the reservoir 701. In some embodiments, the dielectric liquid 801 may be deposited in the reservoir 701 by pouring the dielectric liquid from a container into the reservoir 701. In some embodiments, depositing the dielectric liquid 801 into the reservoir 701 may at least partially (e.g., substantially fully) fill the reservoir 701. For instance, as shown in FIG. 8, the dielectric liquid 801 may be deposited to substantially completely fill the reservoir 701 where the free surface 803 of the dielectric liquid 801 reaches an elevation near or at the peak 805 of the dam 703. In some embodiments, the dielectric liquid 801 may comprise a dielectric precursor and a solvent. In some embodiments, the dielectric precursor that can comprise, without limitation, one or more of a monomer, an accelerator, a curing agent, an epoxy, and/or inorganic particles. In some embodiments, the solvent for the dielectric precursor may comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene).

Figure 9:
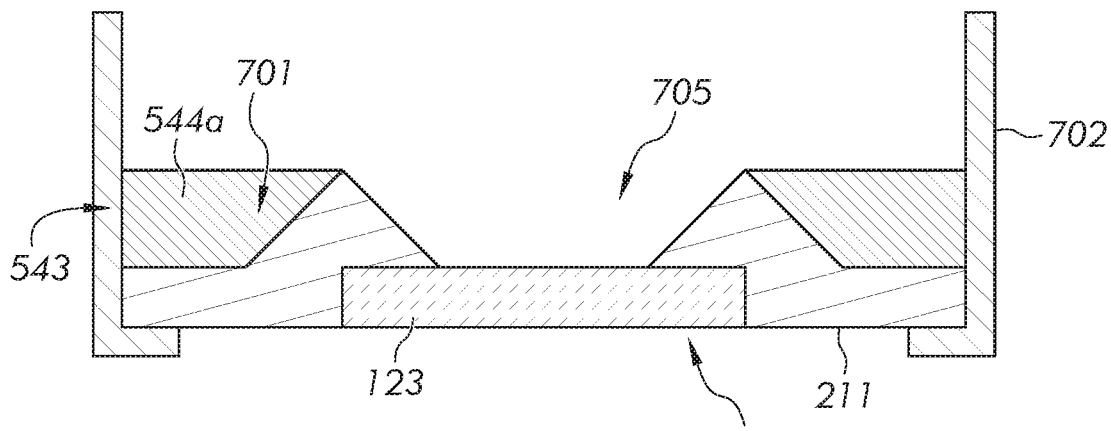
FIG. 9 illustrates another step in the first method of making an electrowetting optical device.

After step 1603, as shown in FIG. 9, methods of the disclosure can proceed to step 1605 that can comprise curing the dielectric liquid 801 to form a second layer 544b of the second dielectric portion 543 of the electrowetting optical device 501. In some embodiments, the curing the dielectric liquid 801 may comprise heating the dielectric liquid 801 to a first temperature to cure the dielectric liquid 801 into the second layer 544b. In some embodiments, the dielectric liquid 801 may not contain a solvent. In further embodiments, the dielectric liquid 801 may contain a solvent, where curing the dielectric liquid 801 can comprise heating the dielectric liquid 801 to a first temperature to drive off the solvent and then further heating the dielectric liquid 801 to a second temperature to cure the dielectric liquid to form the second layer 544b. In still further embodiments, the first temperature may be above the boiling point of the solvent. In further embodiments, heating the dielectric liquid 801 to a first temperature may polymerize the dielectric liquid, and heating the dielectric liquid 801 to a second temperature may form the second dielectric layer by causing the polymerized dielectric liquid 801 to cross-link. In some embodiments curing the dielectric liquid 801 may comprise irradiating the dielectric liquid 801 with ultraviolet (UV) radiation.

Figure 10:
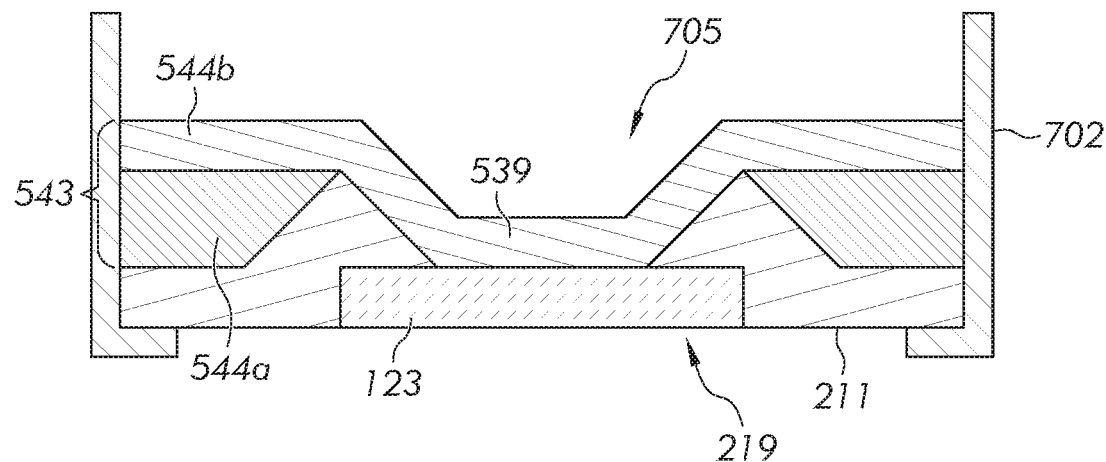
FIG. 10 illustrates another step in the first method of making an electrowetting optical device.

After step 1605, as shown in FIG. 10, methods of the disclosure can proceed to step 1607 that can comprise depositing a dielectric layer comprising the first dielectric portion 539 and the first layer 544a of the second dielectric portion 543 of the electrowetting optical device 501. As shown, in some embodiments, the dielectric layer can comprise a continuous layer of the same material seamlessly extending from the first dielectric portion 539 to the first layer 544a of the second dielectric portion 543. The first dielectric portion 539 can further define the reception area 705 for receiving the first liquid 133 of the electrowetting optical device 501 illustrated in FIG. 5. In some embodiments, the dielectric layer can be deposited during step 1607 by spin coating, physical vapor deposition, chemical vapor deposition, sputtering, spraying, and/or brushing. In some embodiments, the apparatus after step 1607 shown in FIG. 10 may be used as a base 103 (e.g., base 103 of the electrowetting optical device 501 shown in FIG. 5) in an electrowetting optical device of the embodiments of the disclosure.

Figure 11:
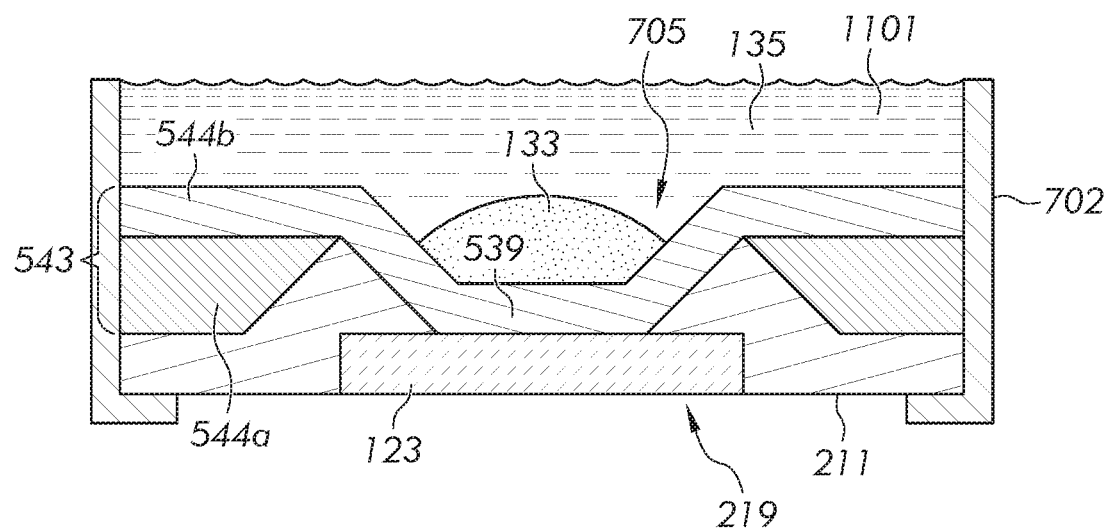
FIG. 11 illustrates another step in the first method of making an electrowetting optical device.
Figure 16:
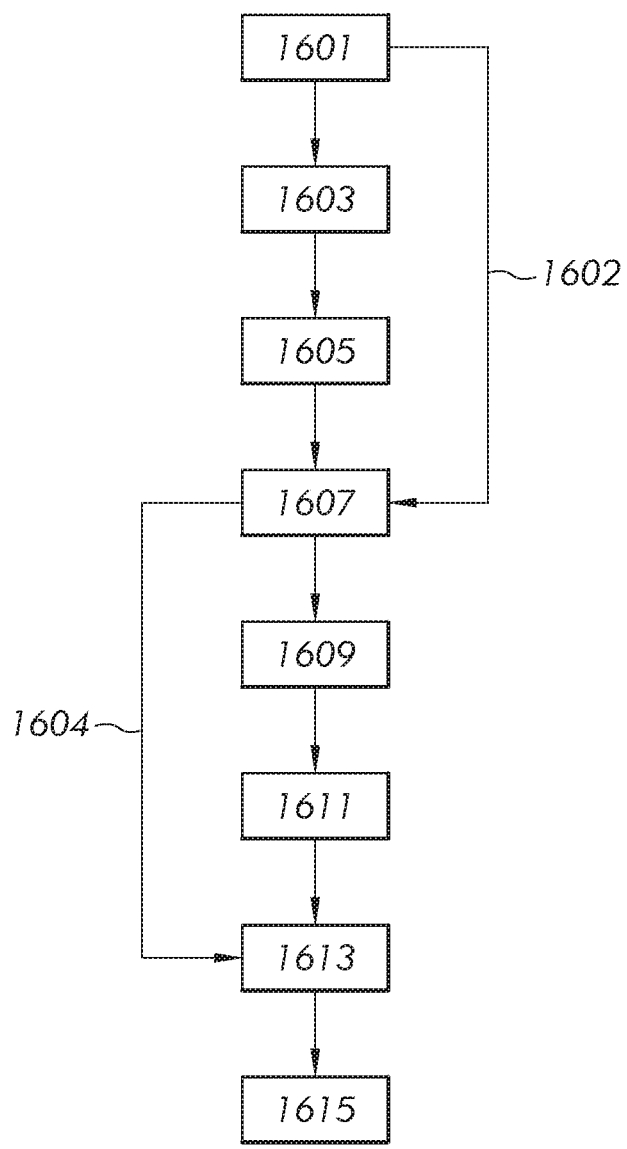
FIG. 16 is a flow chart illustrating example methods of making an electrowetting optical device in accordance with the embodiments of the disclosure.

As indicated by arrow 1604 in FIG. 16, after step 1607, as shown in FIG. 11, methods of the disclosure can proceed to step 1613 of depositing the first liquid 133 and the second liquid 135 within a containment region 1101. In some embodiments, the first liquid 133 may be received within the reception area 705 while the second liquid 135 may partially or entirely fill the remainder of the containment region 1101. As shown, the interface 137 can be formed between the first liquid 133 and the second liquid 135 to form the lens. The method can then proceed to the step 1615 of sealing the first liquid 133 and the second liquid 135 within the fluid-tight containment region 107 of FIG. 5.

Example embodiments of making the electrowetting optical device 401 illustrated in FIG. 4 will now be discussed with reference to FIGS. 7 and 12-15 and the flow chart in FIG. 16. In a first step 1601 of methods of the disclosure, as shown in FIG. 7, initial portions of the electrowetting optical device 501 may be provided as discussed above.

Figure 12:
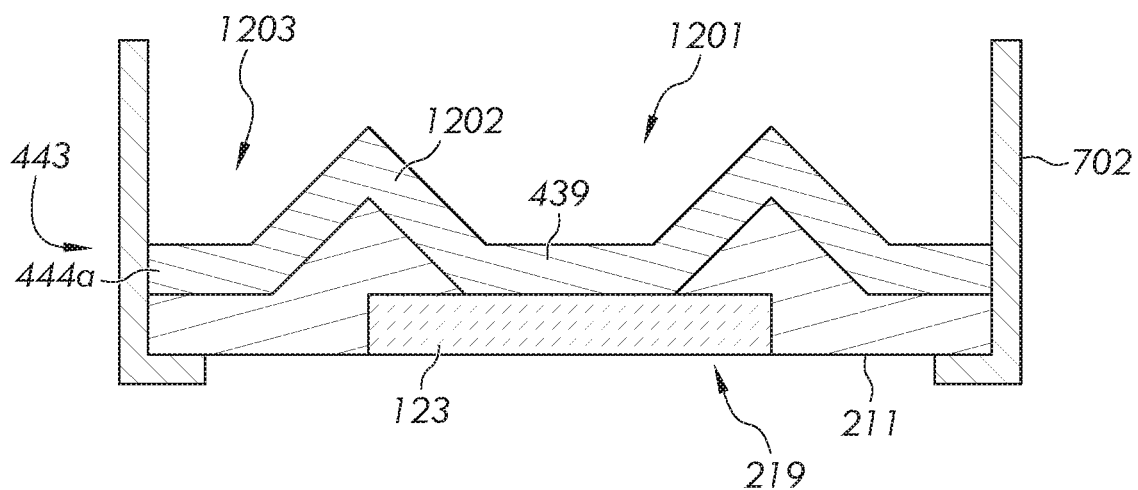
FIG. 12 illustrates another step in the second method of making an electrowetting optical device.

As indicated by arrow 1602 in FIG. 16, after step 1601, as shown in FIG. 12, methods of the disclosure can proceed along arrow 1602 to step 1607, which can comprise depositing a dielectric layer comprising the first dielectric portion 439 and the first layer 444a of the second dielectric portion 443 of the electrowetting optical device 401. As shown, in some embodiments, the dielectric layer can comprise a continuous layer of the same first material seamlessly extending from the first dielectric portion 439 to the first layer 444a of the second dielectric portion 443. The first dielectric portion 439 can define a reception area 1201 for receiving the first liquid 133 of the electrowetting optical device 401 illustrated in FIG. 4. As further illustrated in FIG. 12, portions of the deposited dielectric layer and portions of the base 103 can define a reservoir 1203. For instance, as shown, the first layer 444a of the second dielectric portion 443 can include a dam 1202 to define the reservoir 1203 between an outwardly facing surface of the dam 1202 and an inwardly facing surface of the base apparatus 602. In some embodiments, although not shown, portions of the first dielectric portion 439 may also define the reservoir 1203. In some embodiments, as shown, the dam 1202 may comprise a peripheral dam that circumscribes a reception area 1201. As still shown, in some embodiments, the dam 1202 can comprise a circular peripheral dam that circumscribes the reception area 1201. In some embodiments, the dielectric layer can be deposited during step 1607 by spin coating, physical vapor deposition, chemical vapor deposition, sputtering, spraying, and/or brushing.

Figure 13:
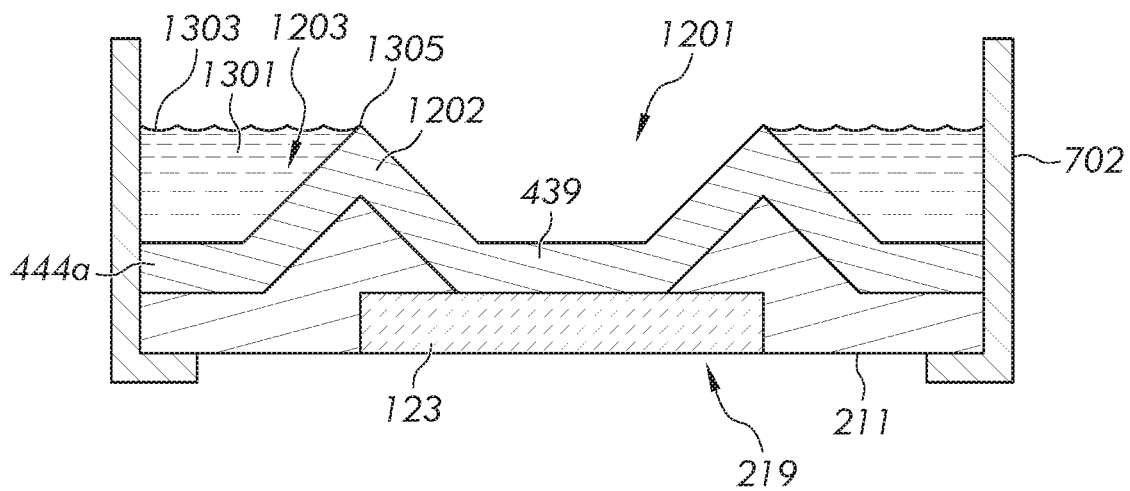
FIG. 13 illustrates another step in the second method of making an electrowetting optical device.

After step 1607, as shown in FIG. 13, methods of the disclosure can proceed to step 1609 of depositing a dielectric liquid 1301 into a reservoir 1203 defined by the first layer 444a of the second dielectric portion 443. In some embodiments, a conduit (e.g., flexible tube or syringe) may be used to deposit a dielectric liquid 1301 into the reservoir 1203. In some embodiments, the dielectric liquid 1301 may be deposited in the reservoir 1203 by pouring the dielectric liquid from a container into the reservoir 1203. In some embodiments, depositing the dielectric liquid 1301 into the reservoir 1203 may partially or substantially fully fill the reservoir 1203. For instance, as shown in FIG. 13, the dielectric liquid 1301 may be deposited to substantially completely fill the reservoir 1203 where the free surface 1303 of the dielectric liquid 1301 reaches the elevation of a peak 1305 of the dam 1202. In some embodiments, the dielectric liquid 1301 may comprise a dielectric precursor and a solvent. In some embodiments, the dielectric precursor that can comprise, without limitation, one or more of a monomer, an accelerator, a curing agent, an epoxy, and/or inorganic particles. In some embodiments, the solvent for the dielectric precursor that may comprise a polar solvent (e.g., water, an alcohol, an acetate, acetone, formic acid, dimethylformamide, acetonitrile, dimethyl sulfoxone, nitromethane, propylene carbonate, poly(ether ether ketone)) and/or a non-polar solvent (e.g., pentane, 1,4-dioxane, chloroform, dichloromethane, diethyl ether, hexane, heptane, benzene, toluene, xylene).

Figure 14:
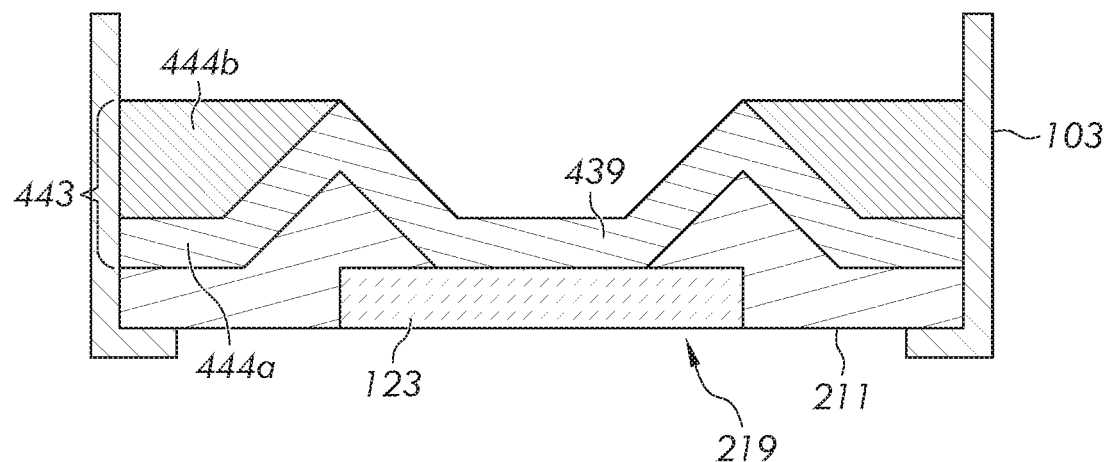
FIG. 14 illustrates another step in the second method of making an electrowetting optical device.

After step 1609, as shown in FIG. 14, methods of the disclosure can proceed to step 1611 of curing the dielectric liquid 1301 to form the second layer 444b of the second dielectric portion 443 of the electrowetting optical device 401. In some embodiments, the curing the dielectric liquid 1301 may comprise heating the dielectric liquid 1301 to a first temperature to cure the dielectric liquid 1301 into the second layer 444b. In some embodiments, the dielectric liquid 1301 may not contain a solvent. In further embodiments, the dielectric liquid 1301 may contain a solvent, where curing the dielectric liquid 1301 can comprise heating the dielectric liquid 1301 to a first temperature to drive off the solvent and then further heating the dielectric liquid 1301 to a second temperature to cure the dielectric liquid to form the second layer 444b. In still further embodiments, the first temperature may be above the boiling point of the solvent. In further embodiments, heating the dielectric liquid 1301 to a first temperature may polymerize the dielectric liquid, and heating the dielectric liquid 1301 to a second temperature may form the second dielectric layer by causing the polymerized dielectric liquid 1301 to cross-link. In some embodiments, the apparatus after step 1611 shown in FIG. 14 may be used as a base 103 (e.g., base 103 of the electrowetting optical device 401 shown in FIG. 4) in an electrowetting optical device of the embodiments of the disclosure.

Figure 15:
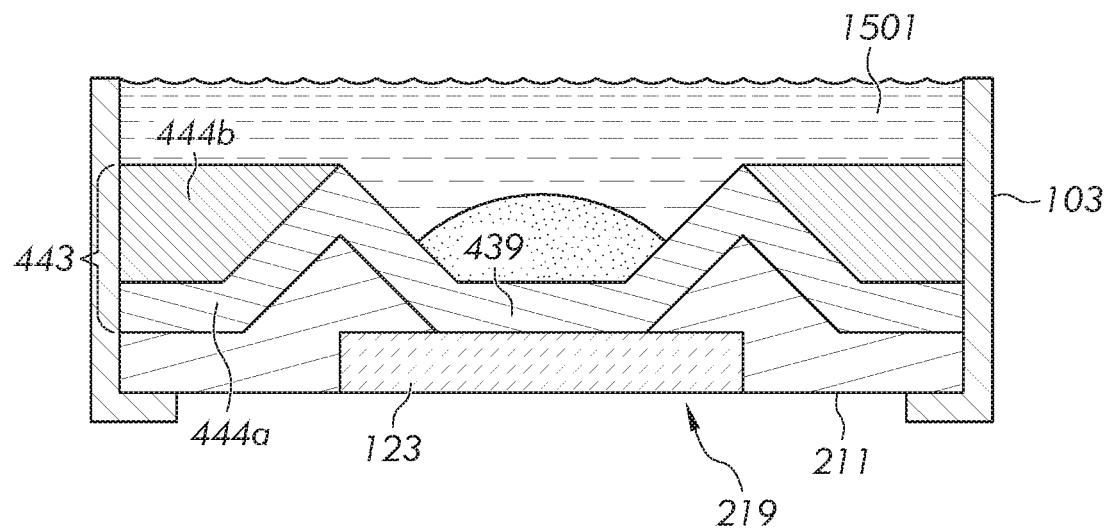
FIG. 15 illustrates another step in the second method of making an electrowetting optical device.

After step 1611, as shown in FIG. 15, methods of the disclosure can proceed to the previously described step 1613 of depositing the first liquid 133 and the second liquid 135 within a containment region 1501. In some embodiments, the first liquid 133 may be received within the reception area 1201 while the second liquid 135 may partially or entirely fill the remainder of the containment region 1501. As shown, the interface 137 can be formed between the first liquid 133 and the second liquid 135 to form the lens. The method can then proceed to the step 1615 of sealing the first liquid 133 and the second liquid 135 within the fluid-tight containment region 107 of FIG. 4.

It should be understood that other methods may be used to form the electrowetting optical devices of the embodiments of the disclosure. As such, dielectric layers may be formed using other methods. Additionally, the electrowetting optical device may comprise more than two dielectric layers.

The electrowetting optical devices of the embodiments of the disclosure may provide the technical benefit of decreased power consumption while retaining optical responsiveness. In some embodiments, a second thickness of a dielectric material outside of a central region that is greater than a first thickness of a dielectric material inside of the central region decrease the applied voltage necessary to obtain a predetermined optical response. In some embodiments, a lower capacitance of the electrowetting optical device decreases the charge (e.g., current) necessary to establish a predetermined voltage between the first electrode and the second electrode. Decreased voltage and/or decreased charge requirements to operate an electrowetting optical device decreases the power consumption of the electrowetting optical device.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise. As used herein, the terms "comprising" and "including", and variations thereof shall be construed as synonymous and open-ended unless otherwise indicated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or endpoint referred to. If a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

While various embodiments have been described in detail with respect to certain illustrative and specific examples thereof, the present disclosure should not be considered limited to such, as numerous modifications and combinations of the disclosed features are possible without departing from the scope of the following claims.

What is claimed is:

1. An electrowetting optical device comprising:
a first electrode at least partially circumscribing a first optical window;
a second electrode at least partially circumscribing a second optical window, wherein the second optical window is aligned with the first optical window along an optical axis;
a central region defined by a projection of a footprint of the second optical window in a direction of the optical axis;
a first dielectric portion covering the second optical window and positioned within the central region, the first dielectric portion comprising a first thickness;
a second dielectric portion at least partially covering the second electrode and at least partially circumscribing the central region, the second dielectric portion comprising a second thickness that is greater than the first thickness; and a first liquid and a second liquid disposed within a containment region, wherein an interface between the first liquid and the second liquid forms a lens.

2. The electrowetting optical device of claim 1, wherein the second thickness is from about 0.5 micrometers to about 1 millimeter greater than the first thickness.

3. The electrowetting optical device of claim 2, wherein the second thickness is from about 10 micrometers to about 250 micrometers greater than the first thickness.

4. The electrowetting optical device of claim 1, wherein the second dielectric portion comprises a first layer comprising a first material and a second layer comprising a second material, the first layer at least partially covering the second electrode, the second layer contacting the first layer, and the first layer disposed between the second electrode and the second layer.

5. The electrowetting optical device of claim 4, wherein the first dielectric portion comprises the first material.

6. The electrowetting optical device of claim 4, wherein the first material comprises a hydrophobic insulating layer.

7. The electrowetting optical device of claim 4, wherein the second material comprises a relative dielectric constant in a range from about 2 to about 50.

8. The electrowetting optical device of claim 4, wherein the first material is the same as the second material.

9. The electrowetting optical device of claim 4, wherein the second material is an epoxy.

10. A method of making the electrowetting optical device of claim 4 comprising:
   depositing a dielectric liquid into a reservoir defined by the second electrode;
   curing the dielectric liquid to form the first layer of the second dielectric portion;
   depositing a dielectric layer comprising the first dielectric portion and the second layer of the second dielectric portion;
   depositing the first liquid and the second liquid within the containment region; and
   sealing the first liquid and the second liquid within the containment region.

11. The method of claim 10, wherein the dielectric liquid comprises at least one of an epoxy or a solvent.

12. The method of claim 11, wherein the dielectric liquid comprises the solvent, and wherein curing the dielectric liquid comprises heating the dielectric liquid to a first temperature to drive off the solvent and then further heating the dielectric liquid to a second temperature to cure the dielectric liquid.

13. A method of making the electrowetting optical device of claim 4 comprising:
   depositing a dielectric layer comprising the first dielectric portion and the first layer of the second dielectric portion;
   depositing a dielectric liquid into a reservoir defined by the first layer of the second dielectric portion;
   curing the dielectric liquid to form the second layer of the second dielectric portion;
   depositing the first liquid and the second liquid within the containment region; and
   sealing the first liquid and the second liquid within the containment region.

14. The electrowetting optical device of claim 1, wherein a capacitance per area of the electrowetting optical device between the first electrode and the second electrode upon application of a maximum operating voltage between the first electrode and the second electrode is in a range from about 0.1 $pF/mm^2$ to about 3.5 $pF/mm^2$.

15. The electrowetting optical device of claim 14, wherein the capacitance per area of the electrowetting optical device between the first electrode and the second electrode upon application of the maximum operating voltage between the first electrode and the second electrode is in a range from about 0.1 $pF/mm^2$ to about 2.5 $pF/mm^2$.

16. The electrowetting optical device of claim 1, wherein the first liquid and the second liquid are immiscible.

17. The electrowetting optical device of claim 1, wherein a central portion of the first dielectric portion covers a central portion of the second optical window.

18. An electrowetting optical device comprising:
   a first electrode and a first optical window, the first electrode at least partially circumscribing the first optical window;
   a base comprising a second electrode and a second optical window, the second electrode comprising a solid conductive material, the second electrode at least partially circumscribing a second optical window, wherein the second optical window is aligned with the first optical window along an optical axis;
   a central region defined by a projection of a footprint of the second optical window in a direction of the optical axis;
   a capacitance per area of the electrowetting optical device between the first electrode and the second electrode upon application of a maximum operating voltage between the first electrode and the second electrode is in a range from about 0.1 $pF/mm^2$ to about 3.5 $pF/mm^2$; and
   a first liquid and a second liquid disposed within a containment region, wherein an interface between the first liquid and the second liquid forms a lens.

19. The electrowetting optical device of claim 18, wherein the capacitance per area of the electrowetting optical device between the first electrode and the second electrode upon application of the maximum operating voltage between the first electrode and the second electrode is in a range from about 0.1 $pF/mm^2$ to about 2.5 $pF/mm^2$.

20. The electrowetting optical device of claim 18, wherein the first liquid and the second liquid are immiscible.

21. The electrowetting optical device of claim 18, wherein the second electrode comprises a solid conductive material.

* * * * *